(12) United States Patent
Imai et al.

(10) Patent No.: US 9,431,850 B2
(45) Date of Patent: Aug. 30, 2016

(54) POWER SUPPLY UNIT HAVING PLURALITY OF SECONDARY BATTERIES

(75) Inventors: Atsushi Imai, Gamagori (JP); Hiroshi Tamura, Nagoya (JP); Shigenori Saito, Nukata-gun (JP)

(73) Assignee: DENSO CORPORATION, Kariya (JP)

( * ) Notice: Subject to any disclaimer, the term of this patent is extended or adjusted under 35 U.S.C. 154(b) by 1083 days.

(21) Appl. No.: 13/095,239

(22) Filed: Apr. 27, 2011

(65) Prior Publication Data
US 2011/0260544 A1 Oct. 27, 2011

(30) Foreign Application Priority Data
Apr. 27, 2010 (JP) .................................. 2010-101829

(51) Int. Cl.
B60L 1/00 (2006.01)
H02J 7/14 (2006.01)

(52) U.S. Cl.
CPC ............ H02J 7/1423 (2013.01); *Y02T 10/7011* (2013.01); *Y02T 10/7016* (2013.01); *Y10T 307/625* (2015.04)

(58) Field of Classification Search
CPC ....... H02J 7/34; H02J 7/0013; Y02T 10/7055
USPC .................. 307/9.1, 10.1; 320/104
See application file for complete search history.

(56) References Cited

U.S. PATENT DOCUMENTS

| | | | | |
|---|---|---|---|---|
| 4,811,065 A | * | 3/1989 | Cogan | H01L 27/0727 257/328 |
| 5,796,175 A | * | 8/1998 | Itoh | B60L 3/0023 307/10.1 |
| 6,229,279 B1 | * | 5/2001 | Dierker | 320/104 |
| 6,232,674 B1 | * | 5/2001 | Frey et al. | 307/10.1 |
| 6,844,634 B2 | | 1/2005 | Kobayashi et al. | |
| 7,336,002 B2 | | 2/2008 | Kato et al. | |

(Continued)

FOREIGN PATENT DOCUMENTS

| | | |
|---|---|---|
| CN | 1495065 A | 5/2004 |
| JP | A-09-107639 | 4/1997 |

(Continued)

OTHER PUBLICATIONS

Apr. 8, 2013 Office Action issued in Chinese Patent Application No. 201110111740.9 (with translation).

(Continued)

*Primary Examiner* — Jared Fureman
*Assistant Examiner* — Alfonso Perez Borroto
(74) *Attorney, Agent, or Firm* — Oliff PLC

(57) ABSTRACT

The power supply unit includes a lead secondary battery (first battery) that is capable of being charged with power generated by an alternator (power generator); a lithium secondary battery (second battery) that is electrically connected in parallel to the lead secondary battery, capable of being charged with power generated by the alternator (power generator), and has higher output density or higher energy density than the lead secondary battery; and a switching means that is electrically connected between the alternator and the lead secondary battery, and the lithium secondary battery, and switches between conduction and blocking. The switching means is configured by a plurality of MOS-FETs (semiconductor switches) being connected in series such that respective parasitic diodes present in the semiconductor switches face opposite directions.

10 Claims, 12 Drawing Sheets

<FIRST EMBODIMENT>

(56) References Cited

U.S. PATENT DOCUMENTS

| | | | |
|---|---|---|---|
| 7,923,858 B2 * | 4/2011 | Ito | H02M 3/1582 |
| | | | 307/9.1 |
| 2007/0170781 A1 * | 7/2007 | Jabaji et al. | 307/10.1 |
| 2009/0206660 A1 * | 8/2009 | Makita | H02J 7/1423 |
| | | | 307/9.1 |
| 2009/0261796 A1 | 10/2009 | Ito et al. | |
| 2010/0308647 A1 * | 12/2010 | Fluhrer | H02J 9/005 |
| | | | 307/9.1 |
| 2011/0001352 A1 | 1/2011 | Tamura et al. | |

FOREIGN PATENT DOCUMENTS

| | | |
|---|---|---|
| JP | A-2004-112900 | 4/2004 |
| JP | A-2004-328988 | 11/2004 |
| JP | A-2005-124275 | 5/2005 |
| JP | A-2006-060883 | 3/2006 |
| JP | A-2007-046508 | 2/2007 |
| JP | A-2007-131134 | 5/2007 |
| JP | A-2008-029058 | 2/2008 |
| JP | A-2008-155814 | 7/2008 |
| JP | A-2009-126395 | 6/2009 |
| JP | A-2011-015516 | 1/2011 |

OTHER PUBLICATIONS

Japanese Office Action issued in Japanese Application No. 2010-101829 on Apr. 17, 2012 (with English translation).

* cited by examiner

FIG.8

| | VEHICLE POWER STATUS | ENGINE STATE | OTHER CONDITIONS | Li CELL RELAY STATE | MOS-FET STATE |
|---|---|---|---|---|---|
| (a) | OFF | STOPPED | — | OFF | OFF |
| (b) | ACC ON | STOPPED | — | OFF | ON |
| (c) | IG ON | STOPPED | BEFORE INITIAL STARTUP | OFF | ON |
| | | STOPPED | AFTER INITIAL STARTUP (DURING IDLE-STOP) | ON | ON OR OFF DEPENDING ON VOLTAGE BALANCE BETWEEN Li BATTERY AND Pb BATTERY |
| | | DURING STARTUP | DURING INITIAL STARTUP | OFF | ON |
| | | DURING STARTUP | DURING RESTART AFTER IDLE-STOP | ON | OFF |
| | | DURING OPERATION (EXCLUDING STARTUP) | DURING DECELERATION REGENERATION | ON | ON OR OFF DEPENDING ON Li BATTERY STATE (SOC, TEMPERATURE, ETC) |
| | | DURING OPERATION (EXCLUDING STARTUP) | OPERATIONS EXCLUDING DECELERATION REGENERATION (ACCELERATION, CONSTANT SPEED, IDLING, ETC.) | ON | ON OR OFF DEPENDING ON Li BATTERY STATE (SOC, TEMPERATURE, ETC) |

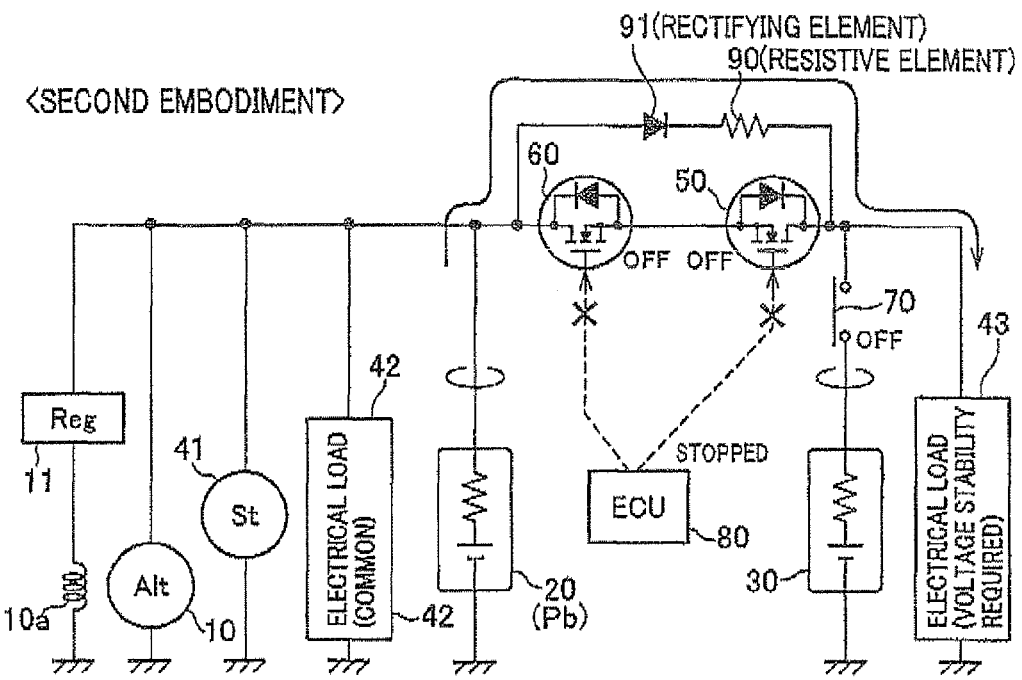
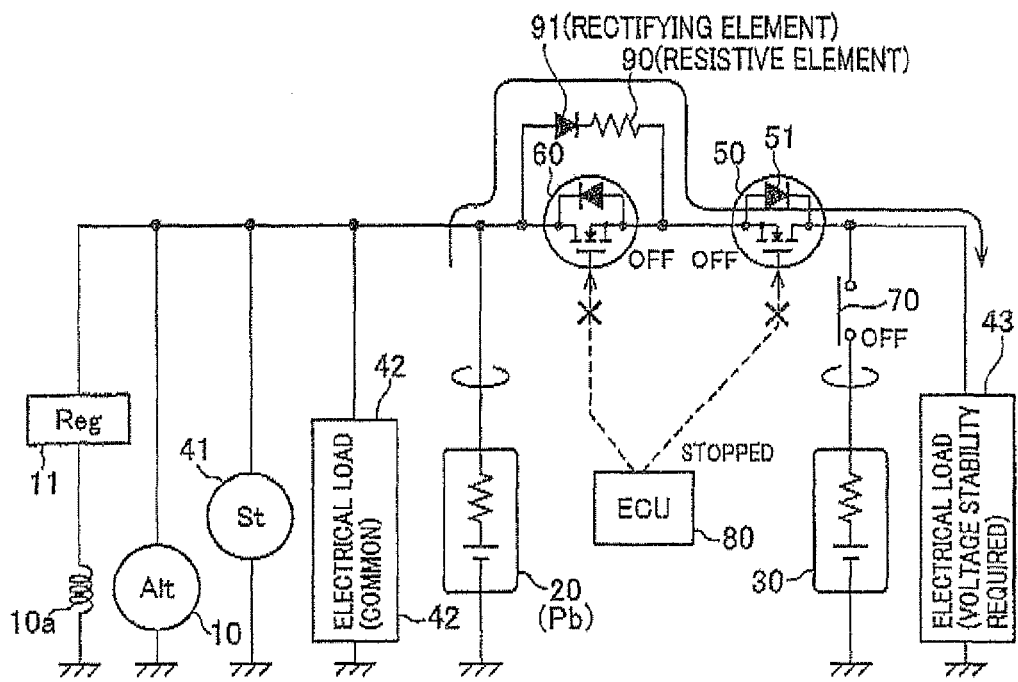

<FOURTH EMBODIMENT>

POWER SUPPLY UNIT HAVING PLURALITY OF SECONDARY BATTERIES

CROSS-REFERENCE TO RELATED APPLICATION

This application is based on and claims the benefit of priorities from earlier Japanese Patent Application No. 2010-101829 filed Apr. 27, 2010, the descriptions of which are incorporated herein by reference.

TECHNICAL BACKGROUND

1. Technical Field

The present invention relates to a power supply unit including two secondary batteries: a lead secondary battery, and a second secondary battery (such as a lithium secondary battery) with higher power density and energy density than the lead secondary battery.

2. Description of the Related Art

A lead secondary battery that supplies power to various electrical loads, such as a starter motor, is commonly mounted in vehicles that use an internal combustion engine as a running drive source. Although the lead secondary battery is less expensive than high-output and high-energy-density secondary batteries (high-performance secondary batteries), such as nickel secondary batteries and lithium secondary batteries, its endurance against frequent charge and discharge (cumulative charge and discharge amount) is low. The lead secondary battery is frequently discharged particularly in vehicles having an idle-stop function, and early deterioration of the lead secondary battery becomes a concern. In addition, the lead secondary battery is frequently charged in vehicles having an alternator that charges the lead secondary battery by generating power from regenerative energy of the vehicle, and early deterioration of the lead secondary battery becomes a concern. Simply changing the lead secondary battery to the above-described high-performance battery to address these concerns leads to a significant increase in cost.

Therefore, JP-A-2007-46508, JP-A-2007-131134, JP-A-2008-29058, 3'P-A-2008-155814, and JP-A-2009-126395 propose to mount both the high-performance secondary battery (second secondary battery) having high endurance against frequent charge and discharge, and, the inexpensive lead secondary battery in parallel connection. In other words, the high-performance secondary battery preferentially supplies power to electrical loads and is charged (regenerative charge in particular) during idle-stop, thereby suppressing deterioration of the lead secondary battery. On the other hand, the inexpensive lead secondary battery supplies power required over a long period of time (dark current supply), such as when the vehicle is parked, thereby reducing the capacity of the high-performance secondary battery and suppressing increase in cost.

Early deterioration becomes a concern when the secondary battery is in an overcharged state or an over-discharged state. Therefore, charge and discharge of both secondary batteries are required to be controlled such that a state of charge (SOC: percentage of actual amount of charge in relation to amount of charge at full charge) expressing the charging state is within a range (appropriate range) where the secondary battery is not overcharged or over-discharged. Specifically, when the SOC of the lead secondary battery falls below the appropriate range, charge of the lead secondary battery is promoted by a setting voltage Vreg of the generated power regulated by a regulator being set to a high voltage. On the other hand, when the SOC of the lead secondary battery rises above the appropriate range, discharge from the lead secondary battery is promoted by the setting voltage Vreg being set to a low voltage.

However, although the value of the open voltage of the secondary battery differs depending on the SOC, the open voltage (such as 12.7V to 12.8V) in the appropriate range of the lead secondary battery and the open voltage in the appropriate range of the high-performance secondary battery ordinarily do not match. Therefore, for example, when the setting voltage Vreg is set to a high voltage to promote charge of the lead secondary battery, the generated power flows into the high-performance secondary battery even when the SOC of the high-performance cell is sufficiently high, and overcharge of the high-performance secondary battery becomes a concern. Furthermore, power is supplied from the high-performance secondary battery to the electrical loads, such as the starter motor, disposed such as to operate using the lead secondary battery as the power supply source, and thus, over-discharge of the high-performance secondary battery becomes a concern.

SUMMARY

An embodiment provides a power supply unit that suppresses deterioration of a lead secondary battery and reduces cost by inclusion of a high-performance secondary battery (second secondary battery) in addition to the lead secondary battery, in which overcharge and over-discharge of the second secondary battery are prevented.

The embodiment has been conceived by focus being placed on issues made apparent through the following examination. Details of the investigation will first be described below, before describing the configuration of the embodiment.

Regarding the above-described concerns, namely overcharge and over-discharge of the second secondary battery, the inventors discussed providing an open and close switch 50 between an alternator 10 (power generator) and a lead secondary battery 20, and a lithium secondary battery 30 (second secondary battery), as shown in FIG. 18A and FIG. 18B. According to this configuration, the above-described concerns can be resolved as a result of the open and close switch 50 blocking current when preventing the lithium secondary battery 30 from being charged while charging the lead secondary battery 20, or when preventing discharge from the lithium secondary battery 30 to the lead secondary battery 20 side.

However, because the open and close switch so is frequently turned ON and OFF, the open and close switch 50 is required to have endurance against ON/OFF switching. Therefore, the inventors decided to use a semiconductor switch, such as a metal-oxide-semiconductor field-effect transistor (MOS-MT), rather than a mechanical relay as the open and close switch 50.

However, because a typical MOS-FET 50 has a parasitic diode therein by structural necessity, it became clear from examination by the inventors that the following issues arise.

In other words, when the MOS-FET 50 is provided oriented as shown in FIG. 18A, even if the MOS-MT 50 is turned OFF, current flows from the alternator 10 to the lithium secondary battery 30 via a parasitic diode 51, when a potential difference that is a barrier voltage of the parasitic diode 51 or greater occurs in the MOS-FET 50 (see the dotted line in FIG. 18A). Therefore, overcharge of the lithium secondary battery 30 cannot be avoided with certainty.

In addition, when the MOS-FET 50 is provided oriented as shown in FIG. 18B, even if the MOS-FET 50 is turned OFF, current flows from the lithium secondary battery 30 to a starter motor 41 via the parasitic diode 51, when a potential difference that is the barrier voltage of the parasitic diode 51 or greater occurs in the MOS-FET 50 (see the dotted line in FIG. 18B). Therefore, over-discharge of the lithium secondary battery 30 cannot be avoided with certainty.

The embodiment prevents overcharge and over-discharge of the second secondary battery, while solving the above-described issues. Operations and effects of the embodiment will hereinafter be described.

According to a first aspect of the embodiment, a power supply unit includes: a power generator that generates power; a first battery that is capable of being charged with the power generated by the power generator; a second battery that is electrically connected in parallel to the first battery, capable of being charged with the power generated by the power generator, and has higher output density or higher energy density than the first battery; and a switching means that is electrically connected between the power generator and the first battery, and the second battery, and switches between conduction and blocking between the power generator and the first battery, and the second battery. The switching means is configured by a plurality of semiconductor switches being connected in series such that respective parasitic diodes present in the semiconductor switches face opposite directions where current flows.

In short, the above-described embodiment is configured by a plurality of semiconductor switches (switching means) being serially connected between a power generator and a lead secondary battery (i.e., first battery), and a second secondary battery (i.e., second battery), such that the respective parasitic diodes present in the semiconductor switches face opposite directions. Therefore, when all semiconductor switches are turned OFF, even when current flows through the parasitic diode of a certain semiconductor switch, conduction is blocked by the other semiconductor switch having a parasitic diode facing the opposite direction.

Therefore, in a situation in which overcharge of the second secondary battery is a concern, if all semiconductor switches are turned OFF, the flow of current from the power generator to the second secondary battery can be avoided with certainty. Thus, overcharge of the second secondary battery can be avoided with certainty. In addition, in a situation in which over-discharge of the secondary battery is a concern, if all semiconductor switches are turned OFF, power supply from the second secondary battery to an electrical load, such as a starter motor, disposed such as to be supplied with power from the lead secondary battery can be avoided with certainty. This, over-discharge of the second secondary battery can be avoided with certainty.

The purpose of providing both the lead secondary battery and the second secondary battery is to reduce the capacity of the second secondary battery and suppress increase in cost, as described above. Therefore, when power is supplied from both secondary batteries to the electrical loads when the internal combustion engine is stopped, because the capacity of the second secondary battery is smaller than that of the lead secondary battery, sufficient power cannot be supplied over a long period of time to an electrical load (second electrical load) disposed such as to be supplied power from the second secondary battery. In this instance, power can be supplied from the lead secondary battery to the second electrical load if the switching means is turned ON. However, when power supply to a control means that controls the output of an energization signal to the switching means is stopped as a result of, for example, an ignition switch being turned OFF (IG OFF), the switching means cannot be turned ON, and power not being able to be supplied to the second electrical load becomes a concern.

In this regard, according to a second aspect of the embodiment, the power supply unit further includes control means for controlling the switching means to be ON and OFF by controlling output of an energization signal applied to the switching means. Moreover, an electrical load capable of being power-supplied by the second battery is provided at the second battery side against the switching means to be electrically connected in parallel to the second battery. The switching means includes an energization maintaining means for maintaining an energized state in which the current flows from the first battery to the second battery side, when a power supply to the control means is stopped.

According to the above-described configuration, even under conditions in which the internal combustion engine is stopped and power supply to the control means is stopped, the energization maintaining means maintains an energized state in which current flows from the lead secondary battery to the second secondary battery side. Therefore, the lead secondary battery having a greater capacity than, the second secondary battery can supply power to the second electrical load.

According to a third aspect of the embodiment, the energization maintaining means includes a resistor electrically connected in parallel to the switching means, and configured to supply power to the second battery side from the first battery via the resistor, when outputting of the energization signal is stopped since power supply to the control means is stopped.

The power supplied from the lead secondary battery to the second electrical load by the maintaining function of the energization maintaining means is presumed to be an extremely small amount. Therefore, even if the resistance value of the resistive element is set sufficiently high, the amount of power supplied to the second electrical load can be sufficiently secured by the energization maintaining means. Thus, even under conditions in which the internal combustion engine is stopped and power supply to the control means is stopped, an energized state in which current is sent from the lead secondary battery to the second secondary battery side via the resistive element can be maintained.

On the other hand, when the internal combustion engine is operating, as a result of the resistance value of the resistive element being set sufficiently high, the amount of power flowing from the lead secondary battery side to the second secondary battery side via the resistive element is small enough to be ignored, even during blocking operation of the switching means.

Therefore, in the embodiment according to the third aspect, because the energization maintaining means can be configured simply by the resistive element being provided, the energization maintaining means can be actualized at low cost, with a small number of components.

According to a fourth aspect of the embodiment, the energization maintaining means includes the resistor and a rectifying element that is connected in series to the resistor and is disposed such that forward direction of the rectifying element is set to allow the current to flow from the first battery to the second battery side.

According to the above-described configuration, under conditions in which the energization maintaining means is maintaining the energized state in accompaniment with the internal combustion engine being stopped and power supply to the control means being stopped, power supply from the second secondary battery to an electrical load disposed such as to be supplied power from the lead secondary battery can be avoided. Therefore, over-discharge prevention of the second secondary battery can be promoted.

According to a fifth aspect of the embodiment, the semiconductor switch in which the forward direction of the parasitic diode is set to allow the current to flow from the first battery to the second battery side, is series-connected to the resistor, and the parasitic diode of the semiconductor switch serving as the rectifying element.

According to the above-described configuration, the number of components can be reduced compared to when a rectifying element dedicated to the energization maintaining means is provided separately from the parasitic diode of the semiconductor switch (see FIG. 12). Alternatively, as a result of the rectifying element dedicated to the energization maintaining means and the parasitic diode of the semiconductor switch being connected in series (see FIG. 11), a configuration can be achieved in which over-discharge of the second secondary battery can be avoided even when either of the rectifying element and the parasitic diode becomes damaged.

According to a sixth aspect of the embodiment, the energization maintaining means is a latch switch having a self-latching function. The latch switch turns on to maintain the energized state by the self-latching when outputting of the energization signal is stopped since power supply to the control means is stopped.

According to the above-described embodiment, even under conditions in which the internal combustion engine is stopped and power supply to the control means is stopped, as a result of the latch switch being turned ON, the energized state in which current is sent from the lead secondary battery to the second secondary battery side can be maintained.

On the other hand, when the internal combustion engine is operating, as a result of the latch switch being turned OFF, an energized state being entered as a result of the energization maintaining means (latch switch) during a blocking operation of the switching means can be completely avoided. In this respect, the embodiment is more advantageous than the embodiment described earlier in which the energization maintaining means is configured by the resistive element.

According to a seventh aspect of the embodiment, the energization maintaining means includes an output holding circuit that holds output of the energization signal, when the power supply to the control means is stopped.

According to the configuration, even under conditions in which the internal combustion engine is stopped and power supply to the control means is stopped, as a result of the energization signal being held in an outputted state, the energized state in which current is sent from the lead secondary battery to the second secondary battery side can be maintained.

According to an eighth aspect of the embodiment, the power supply unit further includes a second switching means electrically connected a current path between the switching means and the second battery. The second switching means is switched by the control means such that the current path is switched between conduction and blocking states, and serving as a normally-open-type switch to be opened when a second energization signal is not inputted by the control means so as to block the current path.

According to the above-described configuration, when power supply to the control means is stopped as a result of, for example, the IG OFF operation being performed, the second switching means that is a normally-open-type switch is opened. Therefore, discharge from the second secondary battery to an electrical load (second electrical load) disposed such as to operate using the second secondary battery as the power supply source can be prevented during IG OFF. Thus, over-discharge caused by the second secondary battery being discharged over a long period of time can be avoided.

In particular, when the above-described embodiment is applied to the embodiment according to any one of the second to seventh aspects, during IG OFF, the lead secondary battery supplies power to the second electrical load as a result of the operation of the energization maintaining means. Therefore, applying the above-described embodiment to the embodiment according to any one of the second to seventh aspects is favorable, because power supply to the second electrical load can be maintained even when discharge of the second secondary battery is prevented by the second switching means.

According to a ninth aspect of the present embodiment, the switching means switches to the conduction so as to charge the second battery when the amount of stored power of the second battery is lower than a lower threshold value.

In a vehicle having an idle-stop function, even when conditions for performing idle-stop (such as the brake pedal being depressed and vehicle speed dropping to zero) have been established, when the amount of stored power of the second secondary battery is less than a lower threshold value as described above, idle-stop is preferably prohibited to prevent over-discharge.

According to a tenth aspect of the present embodiment, the switching means switches to the blocking so as to stop charging the second battery when the amount of stored power of the second battery is higher than a lower threshold value.

During regenerative power generation, the second secondary battery is preferably charged with regeneratively generated power, and collects the regeneratively generated power. However, when the amount of stored power of the second secondary battery is greater than the upper threshold value as described above, energizing operation of the switching means is preferably prohibited even erring regenerative power generation to prevent overcharge.

BRIEF DESCRIPTION OF THE DRAWINGS

FIG. 8 is a diagram of control details for MOS-FET 50 and 60, and a Li secondary battery relay 70, depending on the state of an ignition switch and the state of an accessory switch;

FIG. 10 is an electrical block diagram of a power supply unit according to a second embodiment of the present invention;

FIG. 11 is an electrical block diagram of a first variation example according to the second embodiment;

DETAILED DESCRIPTION OF THE PREFERRED EMBODIMENTS

Figure 1:
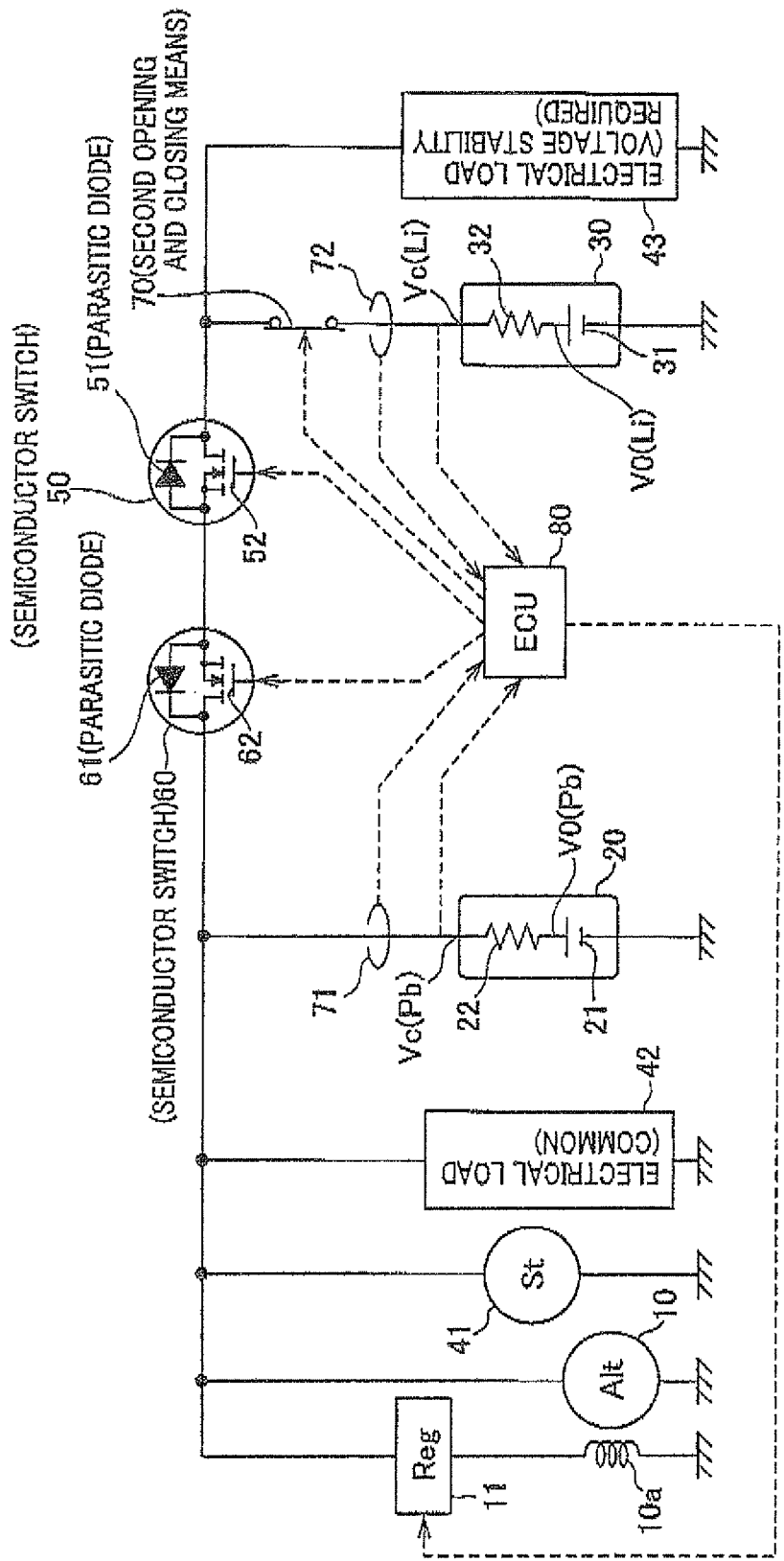
FIG. 1 is en electrical block diagram of a power supply unit according to a first embodiment of the present invention.

Embodiments specifying the present invention will be described with reference to the drawings. Throughout the embodiments, sections that are the same or equivalent to each other are given the same reference number in the drawings, and descriptions of the sections with the same reference numbers are incorporated.

First Embodiment

A vehicle in which a power supply unit according to a first embodiment is mounted uses an internal combustion engine as a running drive source. The vehicle has an idle-stop function that automatically stops the internal combustion engine when predetermined automatic stop conditions are met, and automatically restarts the internal combustion engine when predetermined automatic restart conditions are met. Although a starter motor is included that rotates a crank shaft when the internal combustion engine is started, a running motor that assists in vehicle running is not included.

As shown in FIG. 1, the vehicle includes an alternator 10 (power generator), a regulator 11 (power generation control means), a lead secondary battery 20 (first battery), a lithium-ion battery 30 (second battery), various electrical loads 41, 42, and 43, two MOS-FET 50 and 60 (switching means, and semiconductor switch), and an Li secondary battery relay 70 (second switching means), described hereafter. The lead secondary battery 20, the lithium-ion battery 30, and the electrical loads 41 to 43 are electrically connected in parallel to the alternator 10.

The MOS-FET 50 and 60 are disposed between the alternator 10 and the lead secondary battery 20, and the lithium-ion battery 30, and function as a switching means for switching between energizing (ON) and blocking (OFF) of the lithium-ion battery 30, in relation to the alternator 10 and the lead secondary battery 20.

In addition, the MOS-FET 50 and 60 can be considered to serve as a rectifying means by necessity in terms of the internal structure thereof. In other words, the internal circuits of the MOS-FET 50 and 60 can be considered equivalent to circuits in which semiconductor switch sections 52 and 62 (switching means) are respectively connected in parallel to parasitic diodes 51 and 61 (rectifying means). Input signals to the gates of the semiconductor switch sections 52 and 62 are controlled by an electronic control unit (ECU 80). In other words, an ON operation (energizing operation) and an OFF operation (blocking operation) of the MOS-FET 50 and 60 are controlled such as to be switched by the ECU 80 (control means).

The two MOS-FET 50 and 60 are connected in series such that the parasitic diodes 51 and 61 face opposite directions from each other. Therefore, when the two MOS-FET 50 and 60 are turned OFF, the flow of current through the parasitic diodes 51 and 61 can be completely blocked. Thus, if the two MOS-FET 50 and 60 are turned OFF, discharge from the lithium-ion battery 30 to the lead secondary battery 20 side can be avoided, and charge from the lead secondary battery 20 side to the lithium-ion battery 30 can also be avoided.

The Li secondary battery relay 70 is an electromagnetic relay having a mechanical contact and which does not have a rectifying means. An ON operation (energizing operation) and an OFF operation (blocking operation) of the Li secondary battery relay 70 are controlled such as to be switched by the ECU 80. The Li secondary battery relay 70 is used in emergencies and is always turned ON during ordinary operation. During an emergency of which examples are given hereafter, the Li secondary battery 70 is turned OFF, and overcharge and over-discharge of the lithium-ion battery 30 are avoided.

For example, when the regulator 11 malfunctions and a setting voltage Vreg becomes abnormally high, the lithium-ion battery 30 entering an overcharged state becomes a concern in, this instance, the Li secondary battery relay 70 is turned OFF. In addition, when the lithium-ion battery 30 cannot be charged due to malfunction in the alternator 10 or the MOS-FET 50 and 60, over-discharge of the lithium-ion battery 30 becomes a concern. In this instance as well, the Li secondary battery relay 70 is turned OFF.

The load indicated by reference number 43 of the electrical loads 41 to 43 is a constant-voltage-required electrical load 43 that requires the voltage of the supplied power to be stable, either roughly constant or at least varying within a predetermined range. The constant-voltage-required electrical load 43 is electrically connected on the lithium-ion battery 30 side of the MOS-FET 50 and 60. As a result, power supply to the constant-voltage-required electrical load 43 is assigned to the lithium-ion battery 30.

Specific examples of the constant-voltage-required electrical load 43 include navigation devices and audio devices. For example, when the voltage of the supplied power is not constant and varies significantly, or varies significantly such as to exceed the predetermined range, a problem occurs in that the operation of the navigation device or the like resets when the voltage momentarily falls below a minimum operating voltage. Therefore, the voltage of the power supplied to the constant-voltage-required electrical load 43 is required to be held stable at a constant value that does not fall below the minimum operating voltage.

The load indicated by reference number 41 of the electrical loads 41 to 43 is a starter motor that starts the internal combustion engine. The load indicated by reference number 42 is a common electrical load other than the constant-voltage-required electrical load 43 and the starter motor 41. Specific examples of the common electrical load 42 include headlights, windshield wipers for the front windshield and the like, a blast fan for an air conditioner, and a defroster heater for the rear windshield and the like.

The starter motor 41 and the common electrical load 42 are electrically connected on the lead secondary battery 20 side of the MOS-FET 50 and 60. As a result, power supply to the starter motor 41 and the common electrical load 42 is assigned to the lead secondary battery 20.

The alternator 10 generates power from the rotational energy of a crank shaft. Specifically, when the rotor of the alternator 10 is rotated by the crank shaft, an alternating current is induced in a stator coil based on the excitation current flowing to a rotor coil 10*a*, and the alternating current is converted to a direct current by a rectifier (not shown). Then, as a result of the regulator 11 adjusting the excitation current flowing to the rotor coil 10*a*, the voltage of the generated direct current is adjusted to become the setting voltage Vreg.

The power generated by the alternator 10 is supplied to the various electrical loads 41 to 43, and is also supplied to the lead secondary battery 20 and the lithium-ion battery 30. When the drive of the internal combustion engine is stopped and the alternator 10 is not generating power, the lead secondary battery 20 and the lithium-ion battery 30 supply power to the electrical loads 41 to 43. The setting voltage Vreg is adjusted and the operations of the MOS-FET 50 and 60 are controlled, such that the amount of discharge from the lead secondary battery 20 and the lithium-ion battery 30 to the electrical loads 41 to 43, and the amount of charge from the alternator 10 are within a range (appropriate range) in which the SOC does not become overcharged or over-discharged.

In addition, according to the first embodiment, deceleration regeneration is performed in which the alternator 10 generates power from the regenerative energy of the vehicle and charges both secondary batteries 20 and 30 (primarily the lithium-ion battery 30). The deceleration regeneration is performed when conditions, such as the vehicle being in a deceleration state and fuel injection to the internal combustion engine is being cut, are met.

The lead secondary battery 20 is a known general-purpose secondary battery. Specifically, the cathode active material of the lead secondary battery 20 is lead dioxide ($PbO_2$), the anode active material is lead (Pb), and the electrolyte solution is sulfuric acid ($H_2SO_4$). The lead secondary battery 20 is configured by a plurality of battery cells composed of these electrodes being connected in series. The charge capacity of the lead secondary battery 20 is set to be greater than the charge capacity of the lithium-ion battery 30.

On the other hand, an oxide containing lithium (lithium combined metal oxide) is used as the cathode active material of the lithium-ion battery 30. Specific examples thereof include $LiCoO_2$, $LiMn_2O_4$, $LiNiO_2$, $LiFePO_4$, and the like. Carbon (C), graphite, lithium titanate (such as $Li_xTiO_2$), an alloy containing Si or Su, and the like are used as the anode active material of the lithium-ion battery 30. An organic electrolyte solution is used as the electrolyte solution of the lithium-ion battery 30. The lithium-ion battery 30 is configured by a plurality of battery cells composed of these electrodes being connected in series. According to the first embodiment in particular, lithium titanate is used as the anode active material of the lithium-ion battery 30.

Reference numbers 21 and 31 in FIG. 1 represent battery cell assemblies of the lead secondary battery 20 and the lithium-ion battery 30. Reference numbers 22 and 32 represent internal resistances of the lead secondary battery 20 and the lithium-ion battery 30. In the description hereafter, an open voltage V0 of the secondary battery refers to the voltage generated by the battery cell assemblies 21 and 31. Terminal voltages Vd and Vc of the secondary battery refer to voltages expressed by the following Equations 1 and 2.

$$Vd = V0 - Id \times R \quad \text{(Equation 1)}$$

$$Vc = V0 + Ic \times R \quad \text{(Equation 2)}$$

Here, the discharge current is Id; the charge current is Ic; the internal resistance of the secondary battery is R; and the open voltage of the secondary battery is V0. As indicated by the Equations 1 and 2, the terminal voltage Vd during discharge becomes a smaller value as the internal resistance R increases, and the terminal voltage Vc during charge becomes a larger value as the internal resistance R increases.

Here, because the secondary batteries 20 and 30 are connected in parallel, when charge is performed by the alternator 10, an induced current of the alternator 10 flows into the secondary battery with the lower terminal voltage Vc if the MOS-FET 50 and 60 have been turned ON. On the other hand, when power is supplied (discharged) to the electrical loads 42 and 43, power is discharged from the secondary battery with the higher terminal voltage Vd to the electrical, loads if the MOS-FET 50 and 60 have been turned ON in during non-power generation.

In addition, during regenerative charge, the lithium-ion battery 30 is set to be preferentially charged over the lead secondary battery 20 by increasing the opportunity for the terminal voltage Vc(Li) of the lithium-ion battery 30 to be lower than the terminal voltage Vc(Pb) of the lead secondary battery 20. In addition, during discharge, the lithium-ion battery 30 is set to preferentially discharge power to the constant-voltage-required electrical load 43 over the lead secondary battery 20, by increasing the opportunity for the terminal voltage Vd(Li) of the lithium-ion battery 30 to be higher than the terminal voltage Vd(Pb) of the lead secondary battery 20.

The above-described settings can be actualized by setting the open voltages V0 and the internal resistance values R of the secondary batteries 20 and 30. Setting of the open voltage V0 can be actualized, through selection of the cathode active material, the anode active material, and the electrolyte solution of the lithium-ion battery 30.

Details of the settings for increasing the opportunity for achieving Vc(Li)<Vc(Pb) during regenerative charge and the opportunity for achieving Vd(Li)>Vd(Pb) during discharge will hereinafter be described.

The appropriate range (Pb) of the SOC of the lead secondary battery 20 is SOC 88%- to 92%, and the appropriate range (Li) of the SOC of the lithium-ion battery 30 is SOC 35% to 80%. The upper limit of the appropriate range (Li) is lower than the upper limit of the appropriate range (Pb), and the lower limit of the appropriate range (Li) is lower than the lower limit of the appropriate range (Pb). Furthermore, the lithium-ion battery 30 is set such as to achieve voltage characteristics (relationship between the open voltage and the SOC) of the lithium-ion battery 30 that meet the following conditions (a) to (c), Specifically, through selection of the combination of the cathode active material, the anode active material, and the electrolyte solution of the lithium-ion battery 30, the voltage characteristics meeting the conditions (a) to (c) can be created.

Condition (a) a point VdS at which the open voltage V0(Pb) of the lead secondary battery 20 and the open voltage V0(Li) of the lithium-ion battery 30 match is present within the appropriate range (Pb) of the lead secondary battery 20 and the appropriate range (Li) of the lithium-ion battery 30.

Condition (b); on the upper limit side of the matching point VdS in the appropriate range (Li) of the lithium-ion battery 30, the open voltage V0 (Li) of the lithium-ion battery 30 is higher than the open voltage V0 (Pb) of the lead secondary battery 20.

Condition (c): on the lower limit side of the matching point VdS in the appropriate range (Li) of the lithium-ion battery 30, the open voltage V0 (Li) of the lithium-ion battery 30 is lower than the open voltage V0 (Pb) of the lead secondary battery 20.

Next, a method for switching the MOS-FET 50 and 60ON and OFF depending on the operating state of the engine will be described. The Li secondary battery relay 70 is turned ON at all times unless in an emergency, as described above.

Figure 2:
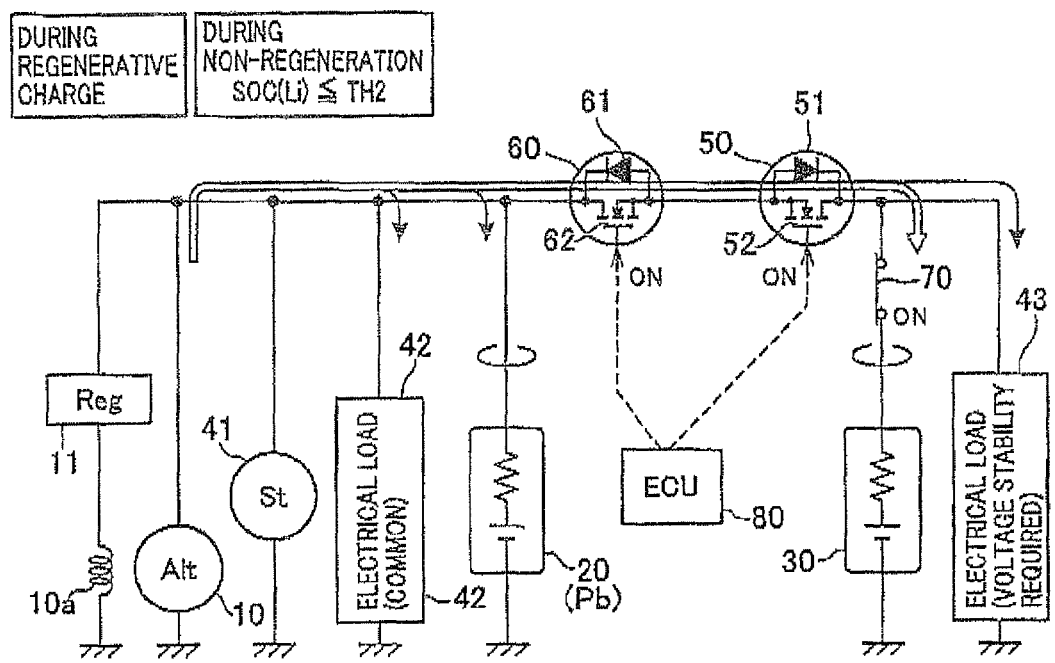
FIG. 2 is a diagram of an operation during regenerative charge performed in the power supply unit in FIG. 1.

As shown in FIG. 2, when the alternator 10 generates power by deceleration regeneration, the MOS-FET 50 and 60 are turned ON. As a result, the power generated by deceleration regeneration charges the lithium-ion battery 30. In addition, a portion of the regenerative energy is also supplied to the electrical loads 42 and 43, and the lead secondary battery 20.

Figure 3:
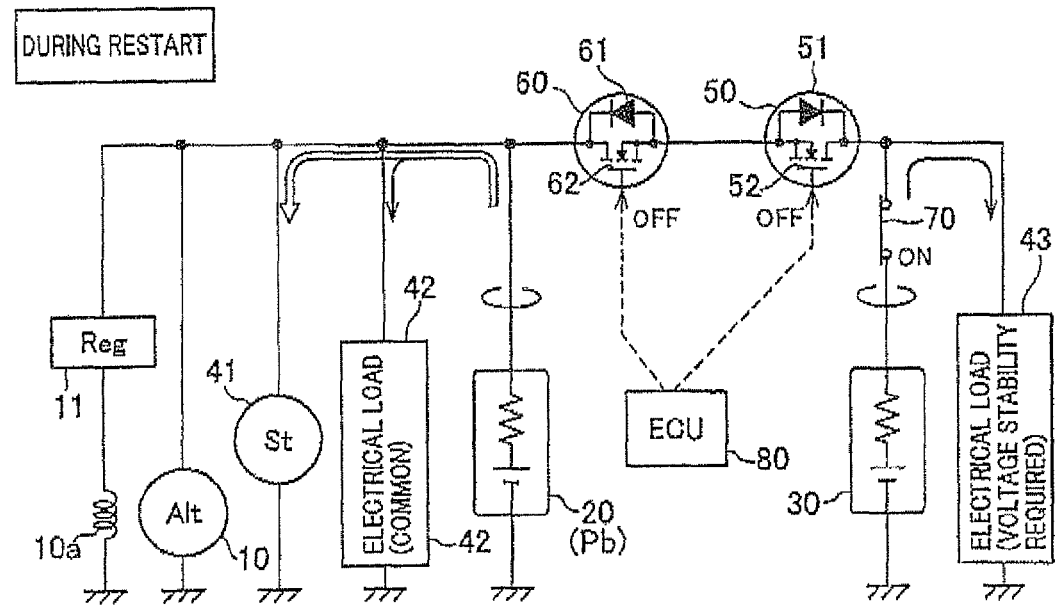
FIG. 3 is a diagram of an operation during automatic restart performed in the power supply unit in FIG. 1.

As shown in FIG. 3, during automatic restart of the idle-stop function, the MOS-FET 50 and 60 are turned OFF. As a result, power supply to the starter motor 41 is performed by the lead secondary battery 20, and discharge from the lithium-ion battery 30 to the starter motor 41 is avoided. The power supplied to the starter motor 41 is significantly greater than the power supplied to the other electrical loads 42 and 43. Therefore, when the lithium-ion battery 30 having a smaller capacity than the lead battery 20 supplies power to the starter motor 41, the SOC(Li) of the lithium-ion battery 30 immediately enters an over-discharged state. Therefore, by avoiding discharge from the lithium-ion battery 30 to the starter motor 41 as described above, over-discharge of the lithium-ion battery 30 can be prevented. The lead secondary battery 20 supplies power to the common electrical load 42, and the lithium-ion battery 30 supplies power to the constant-voltage-required electrical load 43.

Figure 4:
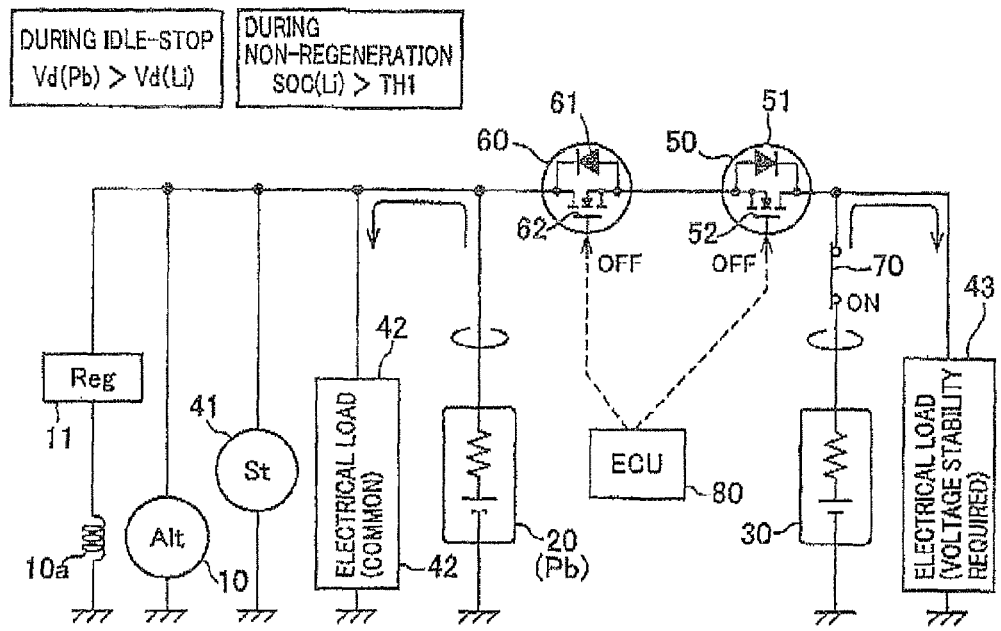
FIG. 4 is a diagram of an operation during idle-stop (Vd(Pb)>Vd(Li)) performed in the power supply unit in FIG. 1.

As shown in FIG. 4, when the terminal voltage Vd(Pb) of the lead secondary battery 20 is higher than the terminal voltage Vd(Li) of the lithium-ion battery 30 during idle-stop (automatic stop) of the idle-stop function, the MOS-FET 50 and 60 are turned OFF. As a result, the flow of current from the lead secondary battery 20 to the lithium-ion battery 30 is avoided, and over-charge of the lithium-ion battery 30 is avoided. The lead secondary battery 20 supplies power to the common electrical load 42, and the lithium-ion battery 30 supplies power to the constant-voltage-required electrical load 43.

Figure 5:
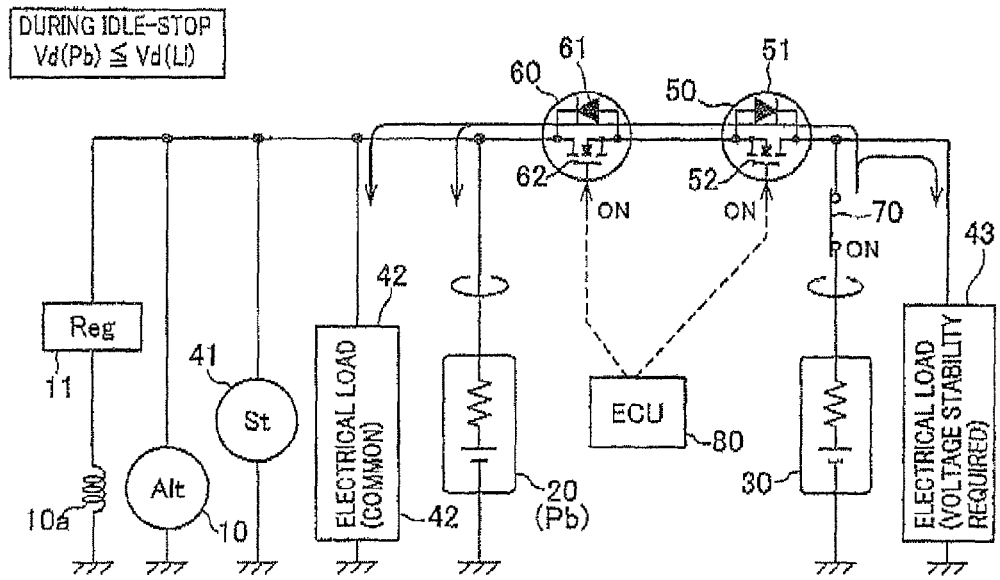
FIG. 5 is a diagram of an operation during idle-stop (Vd(Pb)≤Vd(Li)) performed in the power supply unit, in FIG. 1.

On the other hand, as shown in FIG. 5, when Vd(Pb)≤Vd(Li) during idle-stop of the idle-stop function, the MOS-FET 50 and 60 are turned ON. As a result, because power is supplied to the common electrical load 42 from the lithium-ion battery 30, insufficient power supply to the common electrical load 42 can be resolved. The lead secondary battery 20 is charged by the lithium-ion battery 30, and the lithium-ion battery 30 supplies power to the constant-voltage-required electrical load 43.

During non-regeneration (such as during idling operation, accelerated-running, and steady running) when the alternator 10 is not generating power by deceleration regeneration, ON and OFF of the MOS-FET 50 and 60 is switched depending on the SOC(Li) of the lithium-ion battery 30, thereby controlling the SOC(Li) to be within the appropriate range.

Specifically, when the SOC(Li) is greater than a first threshold TH1 (upper threshold) during non-regeneration, the MOS-FET 50 and 60 are turned OFF as shown in FIG. 4. As a result, power is supplied to the constant-voltage-required electrical load 43 from the lithium-ion battery 30. On the other hand, when the SOC(Li) is a second threshold TH2 (lower threshold) or below during non-regeneration, the MOS-PET 50 and 60 are turned ON as shown in FIG. 2. As a result, power is supplied to the constant-voltage-required electrical load 43 from the lead secondary battery 20 or the alternator 10. As a result, over-discharge of the lithium-ion battery 30 can be avoided.

Control (SOC(Li) optimization control) performed to set the SOC(Li) within the appropriate range as described above will be described with reference to FIG. 6 and FIG. 7.

The ECU 80 acquires detection values of the terminal voltages Vc and Vd of the secondary batteries 20 and 30 or the open voltage V0(Li) at all times, and acquires current values of the currents flowing through the secondary batteries 20 and 30, detected by current detecting means 71 and 72 (see FIG. 1), at all times. The ECU 80 also acquires the temperature (lithium temperature) of the lithium-ion battery 30 and the temperature (lead temperature) of the lead secondary battery 20 at all times. The ECU 80 calculates the SOC(Li) based on the acquired terminal voltages of the lithium-ion battery 30, the lithium temperature, and the like, and also calculates the SOC(Pb) based on the acquired terminal voltages of the lead secondary battery 20, the lead temperature, and the like.

Figure 6:
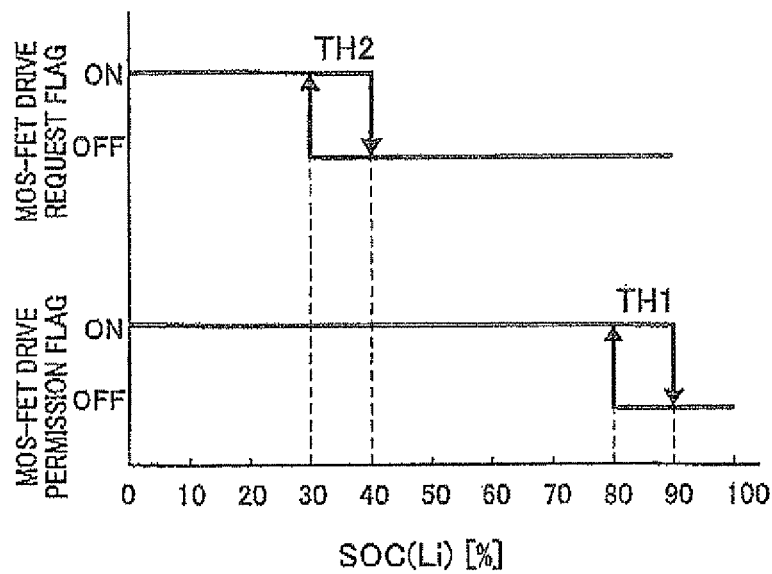
FIG. 6 is a diagram of setting conditions for a drive permission flag and a drive request flag.

A horizontal axis in FIG. 6 indicates the calculated SOC(Li) value. A drive permission flag and a drive request flag for the MOS-FET 50 and 60 are set depending on the SOC(Li) value as described below.

In other words, when the SOC(Li) is greater than the first threshold TH1 (TH1=80 and 90 in the example in FIG. 6), to avoid overcharge of the lithium-ion battery 30, the drive permission flag is set to OFF and, the ON operations of the MOS-FET 50 and 60 are prohibited. As a result, charge of the lithium-ion battery 30 by the alternator 10 or the lead secondary battery 20 is prohibited (see FIG. 4).

On the other hand, when the SOC(Li) is the second threshold TH2 (TH2=30 and 40 in the example in FIG. 6) or below, to avoid over-discharge of the lithium-ion battery 30, the drive request flag is turned ON, and the MOS-FET 50 and 60 are turned ON. As a result, the alternator 10 or the lead secondary battery 20 charges the lithium-ion battery 30 (see FIG. 2). The first threshold TH1 and the second threshold TH2 are set having hysteresis such as to be different values depending on whether the SOC(Li) is rising or falling.

Figure 7:
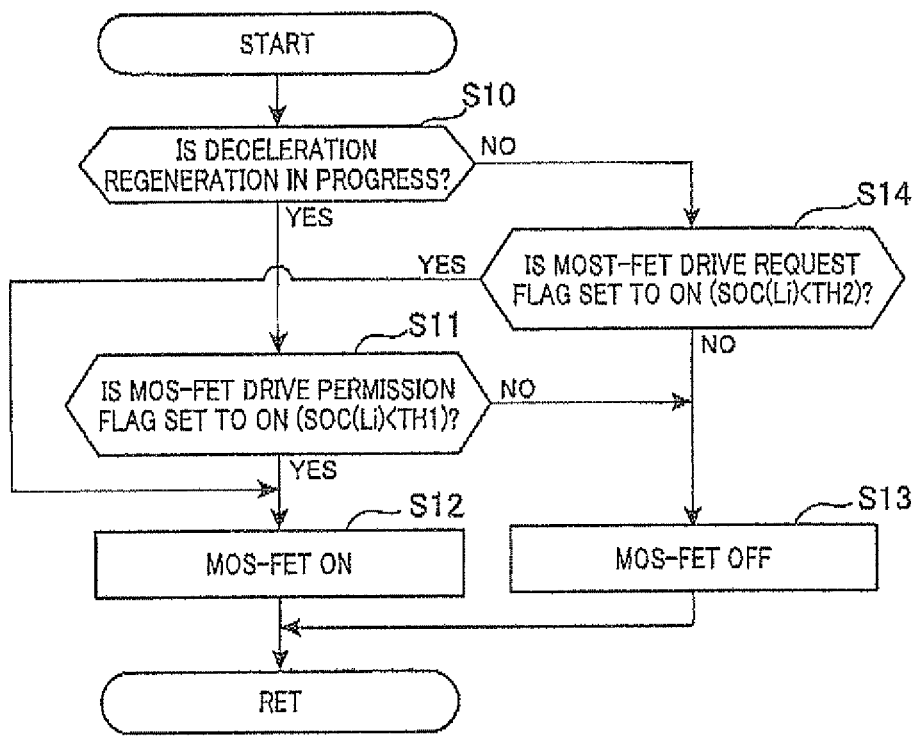
FIG. 7 is a flowchart of procedures for SOC(Li) optimization control.

FIG. 7 is a flowchart of the procedures for SOC(Li) optimization control which is repeatedly performed at a predetermined cycle by a microcomputer in the ECU 80.

First, at Step S10 in FIG. 7, the ECU 80 judges whether or not deceleration regeneration is in progress. When judged that deceleration regeneration is in progress (YES at Step S10), under a condition that the drive permission flag is set to ON(SOC(Li)<TH1) (YES at Step S11), the ECU 80 turns ON the MOS-PET 50 and 60 at subsequent Step S12 (see FIG. 2). As a result, deceleration regenerative power is collected by the lithium-ion battery 30. However, even when judged that the deceleration regeneration is in progress (YES at Step S10), when the drive permission flag is set to OFF (NO at step S11), the ECU 80 prohibits the ON operations of the MOS-FET 50 and 60 at subsequent Step S13, and avoids overcharge of the lithium-ion battery 30. In this instance, regenerative power generation is preferably terminated.

On the other hand, when judged that the deceleration regeneration is not in progress (NO at Step S10), under a condition that the drive request flag is not set to ON(SOC (Li), the ECU 80 turns OFF the MOS-FET 50 and 60 at subsequent Step S13 (see FIG. 4). As a result, the lithium-ion battery 30 discharges to the constant-voltage-required electrical load 43. However, even when judged that deceleration regeneration is not in progress (NO at Step S10), if SOC(Li)<TH2, the ECU 80 turns ON the MOS-FET 50 and 60 at Step S12 (see FIG. 2). As a result, the lead secondary battery 20 or the alternator 10 charges the lithium-ion battery 30, and over-discharge of the lithium-ion battery 30 is avoided.

During idle-stop when judged that deceleration regeneration is not in progress (NO at Step S10), as described earlier with reference to FIG. 4 and FIG. 5, whether the MOS-FET 50 and 60 are turned ON or OFF is decided based on comparison of the Vd(Pb) and Vd(Li). In addition, during restart when deceleration regeneration is not in progress (NO at Step S10), as described earlier with reference to FIG. 3, the MOS-FET 50 and 60 are turned OFF, and over-discharge of the lithium-ion battery 30 is avoided.

As a result of the ON and OFF operations of the MOS-FET 50 and 60 being switched as described above, the SOC(Li) of the lithium-ion battery 30 can be controlled to be within an optimum range. On the other hand, the SOC(Pb) of the lead secondary battery 20 is controlled to be within an optimal range by adjustment of the setting voltage Vreg.

Specifically, when the calculated SOC(Pb) is higher than a predetermined upper threshold value, as a result of the setting voltage Vreg being controlled to be lower than the terminal voltage Vd(Pd) of the lead secondary battery 20, charge from the alternator 10 to the lead secondary battery 20 can be avoided, and overcharge of the lead secondary battery 20 can be prevented. On the other hand, when the calculated SOC(Pb) is lower than a predetermined lower threshold value, as a result of the setting voltage Vreg being controlled to be higher than the terminal voltage Vc(Pb) of the lead secondary battery 20, the alternator 10 charges the lead secondary battery 20, and over-discharge of the lead secondary battery 20 is prevented.

The control details of the MOS-PET 50 and 60, and the like when the ignition switch is operated to be turned ON(IG ON) is described above. In contrast, the description below with reference to FIG. 8 is the control details of the MOS-FET 50 and 60, the Li secondary battery relay 70, and the like when the ignition switch is operated to be turned OFF (IG OFF).

As shown in row (a) in FIG. 8, when the power state of the vehicle is OFF, namely during IG OFF, and an accessory switch is also turned OFF, power supply to the ECU 80 is stopped. In accompaniment, output of an ON/OFF signal (energization signal) from the ECU 80 to the MOS-FET 50 and 60 is also stopped. Therefore, the MOS-FET 50 and 60 are turned OFF.

Here, the Li secondary battery relay 70 is controlled such as to be switched between ON and OFF depending on an ON/OFF signal (second energization signal) from the ECU 80, but is ON at all times in an ordinary, non-emergency situation. A normally-open-type switch that performs an OFF operation (open operation) to block current when the ON/OFF signal is not inputted from the ECU 80 is used as the Li secondary battery relay 70. Therefore, when power supply to the ECU 80 is stopped as described above, the normally-open-type Li secondary battery relay 70 is turned OFF.

As shown in row (b) in FIG. 8, when the accessory switch is turned ON during IG off, because power is supplied to the ECU 80, the MOS-FET 50 and 60 and the LI secondary battery relay 70 can be controlled. However, at this time, it is presumed that judgment permitting the Li secondary battery relay 70 to be turned ON (such as a judgment that the contact of the Li secondary battery relay 70 is not welded, or a judgment that the voltage and temperature of the lithium-ion battery 30 is within a normal range) has not been completed, and therefore, the Li secondary battery relay 70 remains turned. OFF. In addition, as a result of the MOS-FET 50 and 60 being turned ON, the lead secondary battery 20 supplies power to the constant-voltage-required electrical load 43.

As shown in row (c) in FIG. 8, before initial engine startup or during the initial engine startup when the IG ON operation has been performed, it is presumed that the judgment permitting the Li secondary battery relay 70 to be turned ON (such as the judgment that the contact of the Li secondary battery relay 70 is not welded, or the judgment that the voltage and temperature of the lithium-ion battery 30 is within a normal range) has not been completed, and therefore, the Li secondary battery relay 70 remains turned OFF. In addition, as a result of the MOS-FET 50 and 60 being turned ON, the lead secondary battery 20 supplies power to the constant-voltage-required electrical load 43.

In addition, during idle-stop, as described earlier with reference to FIG. 4 and FIG. 5, whether the MOS-FET 50 and 60 are turned ON or OFF is decided based on comparison of the Vd(Pb) and Vd(Li), and the Li secondary battery relay 70 is turned ON.

During restart after idle-stop, as described earlier with reference to FIG. 3, the MOS-FET 50 and 60 are turned OFF, and the Li secondary battery relay 78 is turned ON.

During deceleration regeneration, as described earlier with reference to FIG. 2, the MOS-FET 50 and 60 are turned ON and the Li secondary battery relay 70 is turned ON. However, when SOC(Li)≧TH1 and the drive permission flag is not set to ON(NO at Step S11), the ON operations of the MOS-FET 50 and 60 are prohibited.

During ordinary operation other than startup and deceleration regeneration, the ON-OFF operations of the MOS-FET 50 and 60 are decided based on the setting of the drive request flag, and the Li secondary battery relay 70 is turned ON.

Figure 9:
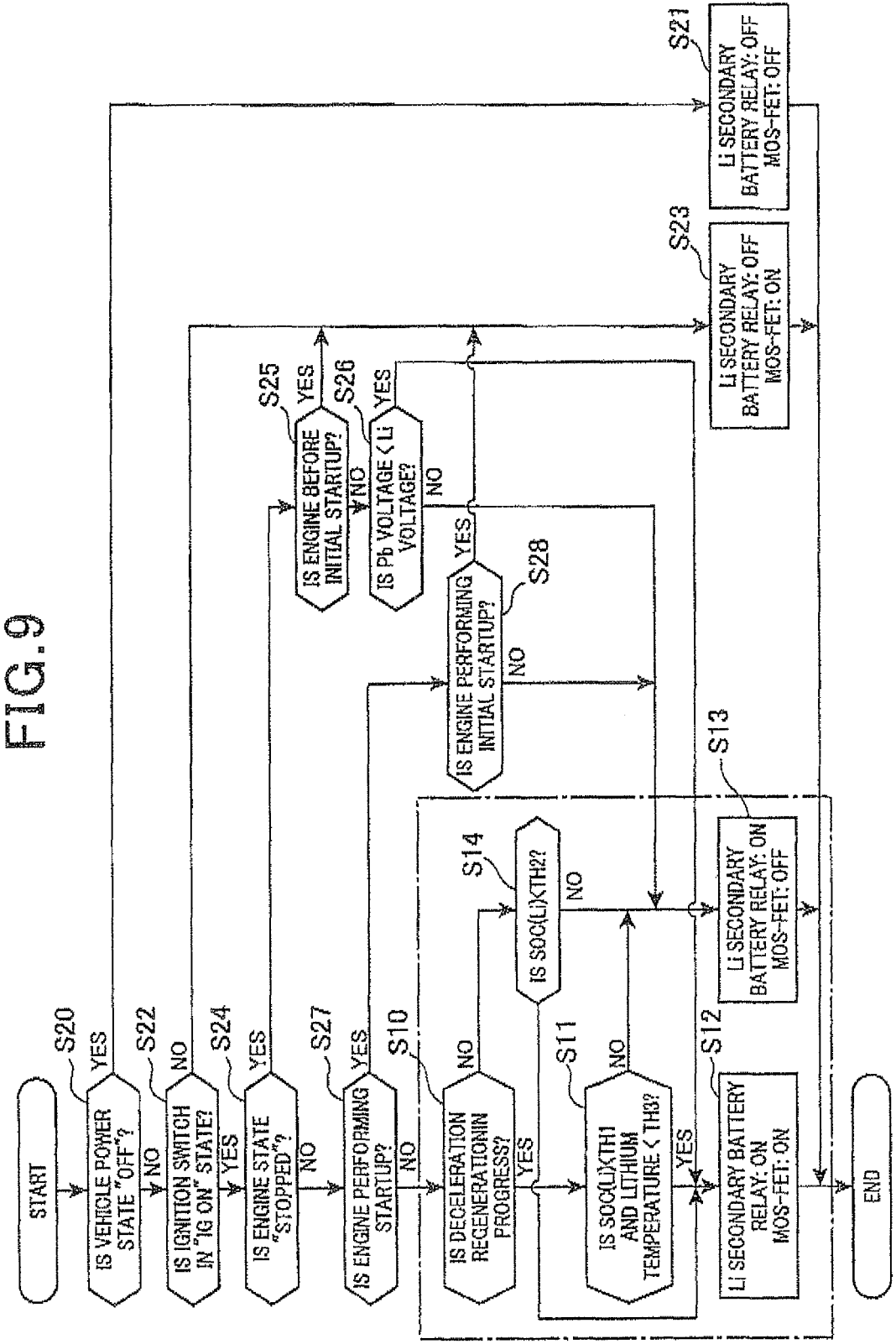
FIG. 9 is a flowchart of procedures in a process performed by an ECU 80 to perform control as shown in FIG. 8.

FIG. 9 is a flowchart of the procedures of the process performed by the ECU 80 to perform control as shown in FIG. 8. First, at Step S20 in FIG. 9, the ECU 80 judges whether or not the vehicle is in a power OFF state in which the ignition switch is in an IG OFF state, and the accessory switch is off. When judged that the vehicle power is OFF (YES at Step S20), power supply to the ECU 80 is stopped and the MOS-PET 50 and 60 and the Li secondary battery relay 70 enter an OFF state (Step S21).

When judged that the vehicle power is not OFF (NO at Step S20), the ECU 80 judges whether or not the ignition switch is in the IG ON state at subsequent Step S22. When judged that the ignition switch is not in the IG ON state (NO at Step S22), or in other words, the accessory switch is ON, the ECU 80 turns ON the MOS-FET 50 and 60, and keeps the Li secondary battery relay 70 in the OFF state (Step S23).

When judged that the ignition switch is in the IG ON state (YES at Step S22), the engine is stopped (YES at Step S24), and the engine is before initial startup (YES at Step S25), the ECU 80 turns ON the MOS-FET 50 and 60 and keeps the Li secondary battery relay 70 in the OFF state (S23).

When judged that the ignition switch is in the IG ON state (YES at Step S22), the engine is stopped (YES at Step S24), and the engine is not before the initial startup (NO at Step S25), the ECU 80 decides whether to perform the ON operation or the OFF operation of the MOS-FET 50 and 60 based on comparison of the Vd(Pb) and Vd(Li). Specifically, when Vd(Pb)<Vd(Li) (YES at Step S26), the ECU 80 turns on the MOS-FET 50 and 60, and turns ON the Li secondary battery relay 70 (Step S12). On the other hand, when Vd(Pb)≥Vd(Li) (NO at Step S26), the ECU 80 turns OFF the MOS-FET 50 and 60, and turns ON the Li secondary battery relay 70 (Step S13).

When judged that the ignition switch is in the IG ON state (YES at Step S22) and the engine is operating (NO at Step S24), if judged that the engine is performing initial startup (YES at Step S27 and YES at Step S28), the ECU 80 turns ON the MOS-FET 50 and 60, and keeps the Li secondary battery relay 70 in the OFF state (Step S23). On the other hand, during automatic restart of the idle-stop function (YES at Step S27 and NO at Step S28), the ECU 80 turns OFF the MOS-FET 50 and 60, and turns ON the Li secondary battery relay 70 (step S13).

When judged that the engine is operating (NO at Step S24), if judged that the engine is not performing startup (NO at Step S27), the ECU 80 performs the above-described process in FIG. 7 (processes at Step S10 to Step S30 indicated by the dashed line). On other words, the ECU 60 decides the ON state and the OFF state of the MOS-FET 50 and 60 based on whether or not deceleration regeneration is in progress and depending on the states of the drive request flag and the drive permission flag.

The lithium temperature rises during charge of the lithium-ion battery 30. When the lithium battery temperature becomes excessively high, deterioration of the lithium-ion battery 30 is promoted. Therefore, the ON operation of the MOS-FET 50 and 60 (in other words, charge of the lithium-ion battery 30) at Step S12 may be performed under a condition that the lithium temperature is less than a predetermined value TH3 in the processes at Step S11 and Step S13.

From the above, the following effects can be achieved according to the first embodiment.

In other words, a plurality of MOSFET transistors i.e., two MOS-FET 50 and 60 are connected in series such that the parasitic diodes 51 and 61 face opposite directions, between the alternator 10, the lead secondary battery 20, and the lithium-ion battery 30. Therefore, when both MOS-FET 50 and 60 are turned OFF, the flow of current through either of the parasitic diodes 51 and 61 is blocked.

As a result, in a situation where overcharge of the lithium-ion battery 30 is a concern, if the MOS-FET 50 and 60 are turned OFF, the flow of current from the alternator 10 or the lead secondary battery 20 to the lithium-ion battery 30 can be avoided with certainty. Therefore, overcharge of the lithium-ion battery 30 can be prevented with certainty. In addition, in a situation where over-discharge of the lithium-ion battery 30 is a concern, if the MOS-FET 50 and 60 are turned OFF, discharge from the lithium-ion battery 30 to the starter motor 41 in particular can be avoided with certainty. Therefore, over-discharge of the lithium-ion battery 30 can be prevented with certainty.

When the SOC(Pb) of the lead secondary battery 20 is controlled to be within the appropriate range by adjustment of the setting voltage Vreg, when the lithium-ion battery 30 is not to be charged, if the MOS-FET 50 and 60 are turned OFF, the setting voltage Vreg can be adjusted regardless of the magnitude of the terminal voltage Vc of the lithium-ion battery 30. On the other hand, the SOC(Li) of the lithium-ion battery 30 can be adjusted by the MOS-FET 50 and 60 being switched between ON and OFF. Therefore, the SOC(Pb) and the SOC(Li) can be independently and separately controlled.

Second Embodiment

When the power state of the vehicle is OFF, in accompaniment with the power supply to the ECU 80 being stopped, the output of the ON/OFF signal from the ECU 80 to the MOS-PET 50 and 50 is also stopped. Therefore, as described above, the MOS-PET 50 and 60, and the Li secondary battery relay 70 are also turned OFF.

Therefore, although the dark current to the common electrical load 42 that is required during power OFF is supplied from the lead secondary battery 20, the dark current to the constant-voltage-required electrical load 43 that is required during power supply OFF cannot be supplied from the lithium-ion battery 30. If, for example, a normally-closed-type relay is used as the Li secondary battery relay 70, the dark current can be supplied from the lithium-ion battery 30 to the constant-voltage-required electrical load 43. However, because the capacity of the lithium-ion battery 30 is set to be significantly smaller than that of the lead secondary battery 20, the lithium-ion battery 30 immediately becomes over-discharged.

Regarding this concern, according to a second embodiment, a resistive element 90 (energization maintaining mean) is connected in parallel to the MOS-FET 50 and 60 as shown in FIG. 10. During power OFF, the dark current is supplied to the constant-voltage-required electrical load from the lead secondary battery 20 via the resistive element 90.

The dark current to the constant-voltage-required electrical load 43 that is required during power OFF is presumed to be an extremely small amount of power. Therefore, even if the resistance value of the resistive element 90 is set sufficiently high, the amount of dark current supplied to the constant-voltage-required electrical load 43 can be sufficiently secured. During power ON, as a result of the resistance value of the resistive element 90 being set sufficiently high, the amount of power flowing from the lead secondary battery 20 side to the lithium-ion battery 30 side via the resistive element 90 can be set to be small enough to be ignored, even when the MOS-FET 50 and 60 are turned OFF.

Furthermore, according to the second embodiment, a rectifying element 91 is connected in series to the resistive element 90, as shown in FIG. 10. The rectifying element 91 is disposed oriented such that the direction in which the current is sent from the lead secondary battery 20 side to the lithium-ion battery 30 side is the forward direction. Zs result, even if the Li secondary battery relay 70 malfunctions and remains turned ON during power OFF, dark current supply to the common electrical load 42 from the lithium-ion battery 30 via the resistive element 90 can be avoided during power OFF, and over-discharge of the lithium-ion battery 30 can be avoided.

In addition, because the normally-open-type relay is used as the Li secondary battery relay 70, the Li secondary battery relay 70 can remain in the OFF state during power OFF. Therefore, dark current supply to the constant-voltage-required electrical load 43 during power OFF can be assigned to the lead secondary battery 20, and dark current supply to the constant-voltage-required electrical load 43 from the lithium-ion battery 30 can be avoided. Therefore, overdischarge of the lithium secondary cell 30 during power OFF can be avoided.

First Variation Example According to Second Embodiment

Although the resistive element 90 is connected in parallel to the two MOS-FET 50 and 60 in FIG. 10, the connection of the resistive element 90 may be modified as shown in FIG. 11. In other words, the resistive element 90 and the rectifying element 91 are connected in series to the MOS-PET 50 disposed oriented such that the direction in which current flows from the lead secondary battery 20 side to the lithium-ion battery 30 side is the forward direction, and are connected in parallel to the MOS-FET 60 disposed facing the opposite direction.

As a result, because the dark current can be supplied to the constant-voltage-required electrical load 43 from the lead secondary battery 20 via the resistive element 90 and the parasitic diode 51 during power OFF, effects similar to those according to the embodiment shown in FIG. 10 can be achieved.

In the first variation example, the dark current flowing through the resistive element 90 during power OFF is rectified by both the rectifying element (parasitic diode 51) of the MOS-FET 50 and the rectifying element 91. Therefore, even should the rectification function of either rectifying element malfunction, discharge to the common electrical load 42 from the lithium-ion battery 38 during power OFF can be avoided with certainty.

Second Variation Example According to Second Embodiment

Figure 12:
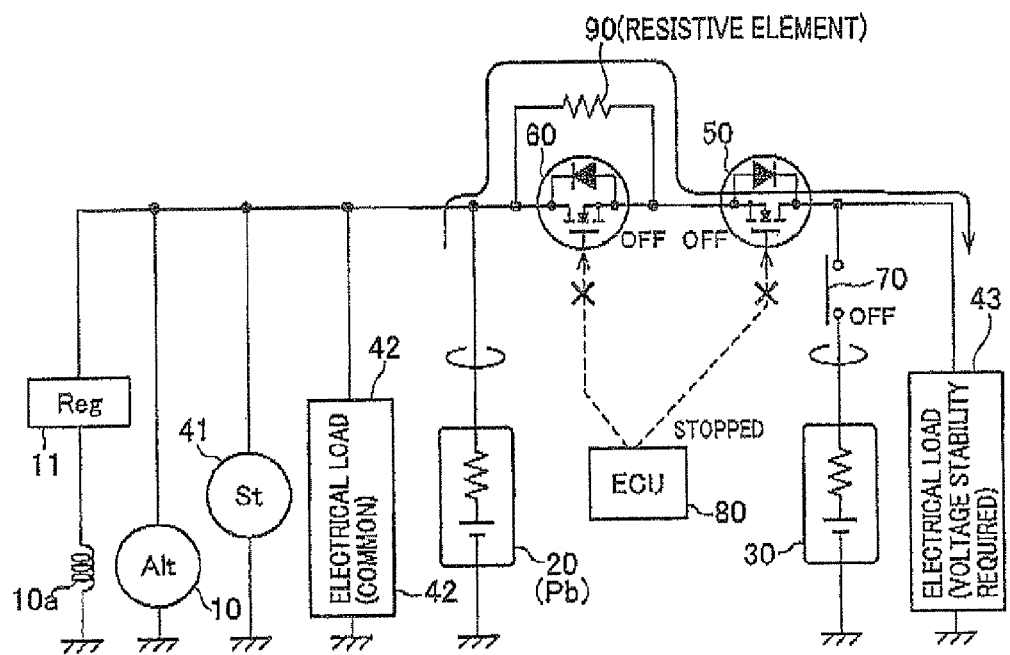
FIG. 12 is an electrical block diagram of a second variation example according to the second embodiment.

Although the rectifying element 91 is connected in series to the resistive element 90 in FIG. 10 and FIG. 11, the rectifying element 91 may be eliminated and the rectification function for the dark current during power OFF may be achieved by the rectifying element (parasitic diode 51) of the MOS-FET 50 as shown in FIG. 12. Effects similar to those in FIG. 10 are achieved in this instance as well.

Figure 13:
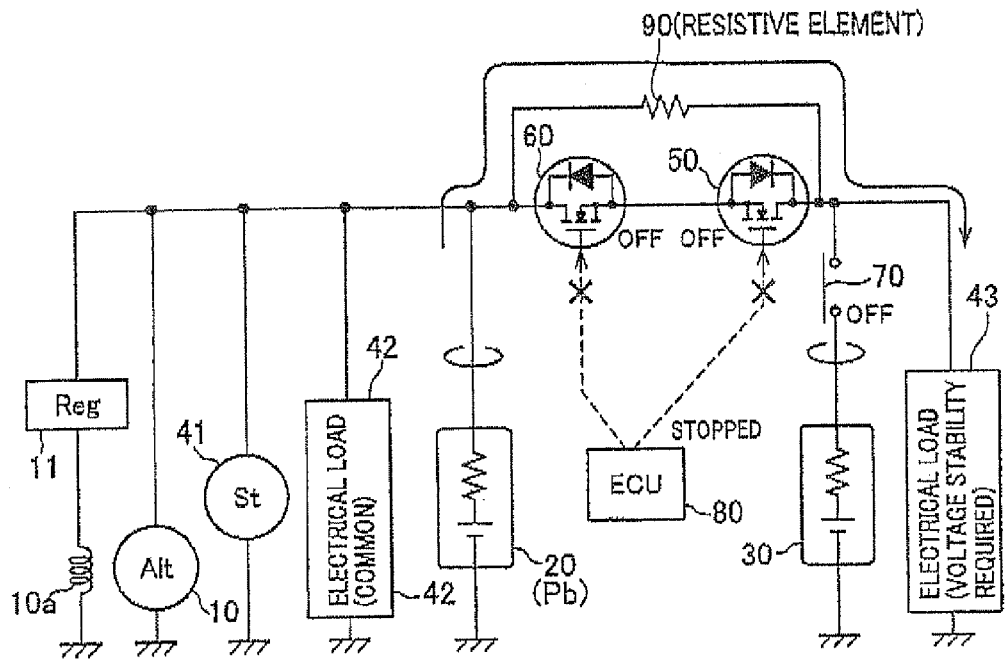
FIG. 13 is an electrical block diagram of the second variation example according to the second embodiment.

When the rectifying element 91 is eliminated, the resistive element 90 may be connected in parallel to the two MOS-FET 50 and 60, as shown in FIG. 13. The dark current can be supplied to the constant-voltage-required electrical load 43 from the lead secondary battery 20 via the resistive element 90 during power OFF in this instance as well.

Third Embodiment

According to the above-described second embodiment shown in FIG. 10 to FIG. 13, the dark current is supplied to the constant-voltage-required electrical load 43 from the lead secondary battery 20 via the resistive element 90 during power OFF. On the other hand, according to a third embodiment shown in FIG. 14, a latch relay 92 (latch switch (energization maintaining means)) having a self-latching function replaces the resistive element 90, and the rectifying element 91 becomes unnecessary in this instance.

An ON operation and an OFF operation of the latch relay 92 are controlled by being switched by the ECU 80. When the accessory switch is turned ON and power is supplied to the ECU 80, the latch relay 92 is controlled such as to be OFF at all times. Immediately before power supply to the ECU 90 is blocked when the accessory switch is turned OFF, the ECU 80 turns ON the latch relay 92. Therefore, after power supply to the ECU 80 is blocked, the latch relay 90 remains in the ON state.

As a result, during power OFF, the dark current can be supplied to the constant-voltage-required electrical load 43 from the lead secondary battery 20 through the latch relay 92 that is turned ON. In addition, according to the above-described embodiment shown in FIG. 10 to FIG. 13 that uses the resistive element 90, current, though a minimal amount, flows through the resistive element 90 during power ON, even when the MOS-FET 50 and 60 are turned OFF. On the other hand, according to the third embodiment, because the latch relay 92 is controlled to be OFF at all times during power ON, the current can be completely blocked when the MOS-FET 50 and 60 are turned OFF.

However, because the number of components according to the above-described embodiment in which the resistive element 90 is used can be reduced compared to that when the latch relay 92 is used, the above-described embodiment is advantageous in terms of size reduction and cost reduction.

The latch switch according to the third embodiment is configured having a mechanical relay in which a contact is opened and closed by an electromagnetic solenoid, and a self-latching circuit. However, the latch switch may be configured by a semiconductor switch and the self-latching circuit.

Variation Example According to Third Embodiment

Figure 15:
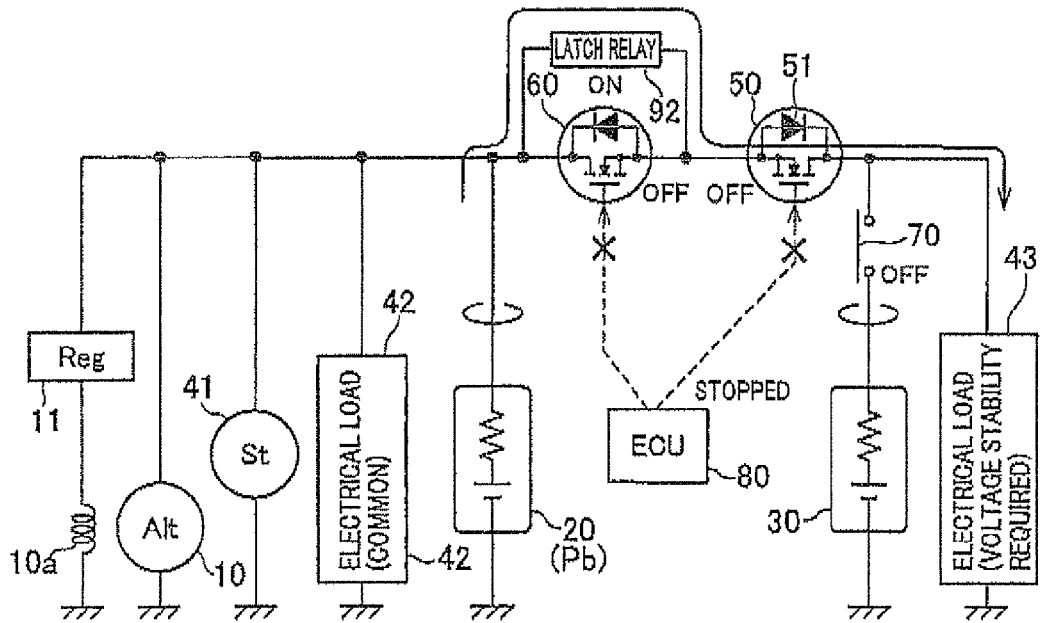
FIG. 15 is an electrical block diagram of a variation example according to the third embodiment.

Although the latch relay 92 is connected in parallel to the two MOS-FET 50 and 60, the connection of the latch relay 92 may be modified as shown in FIG. 15. In other words, the latch relay 92 is connected in series to the MOS-FET 60 disposed oriented such that the direction in which the current is sent from the lead secondary battery 20 side to the lithium-ion battery 30 side is the forward direction, and is connected in parallel to the MOS-FET 60 disposed facing the opposite direction.

Figure 14:
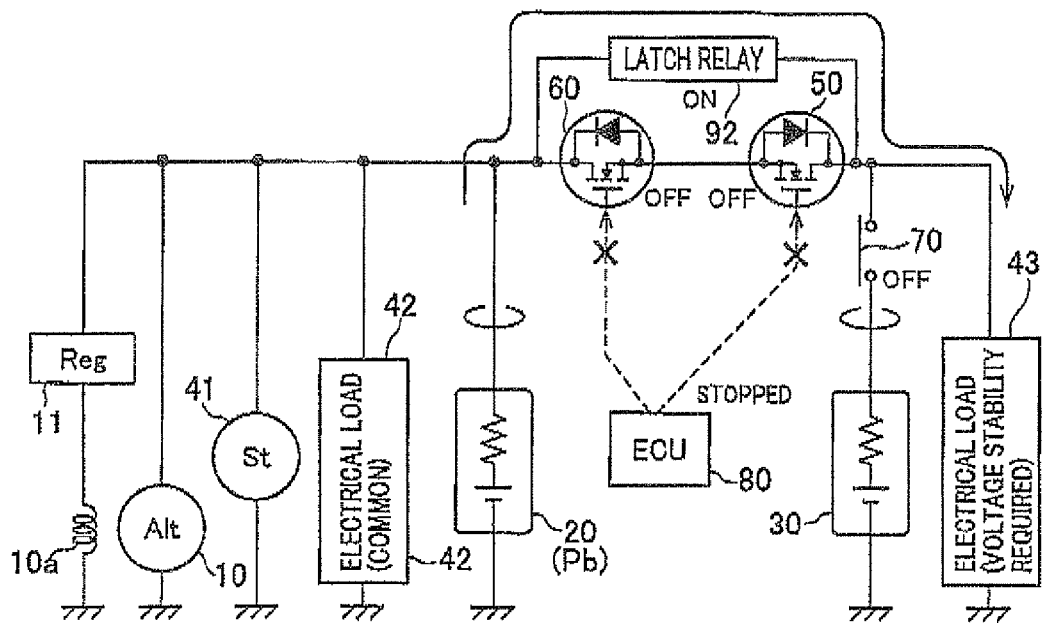
FIG. 14 is an electrical block diagram of a power supply unit according to a third embodiment of the present invention.

As a result, because the dark current can be supplied to the constant-voltage-required electrical load 43 from the lead secondary battery 20 via the latch relay 92 and the parasitic diode 51, effects similar to those according to the embodiment shown in FIG. 14 are achieved.

In the variation example, even if the Li secondary battery relay 70 malfunctions and does not enter an energization OFF state during power OFF, as a result of the rectification effect of the parasitic diode 51, dark current supply to the common electrical load 42 from the lithium-ion battery 30 via the latch relay 92 can be prevented. Therefore, overdischarge of the lithium-ion battery 30 during power OFF can be suppressed.

Fourth Embodiment

Figure 16:
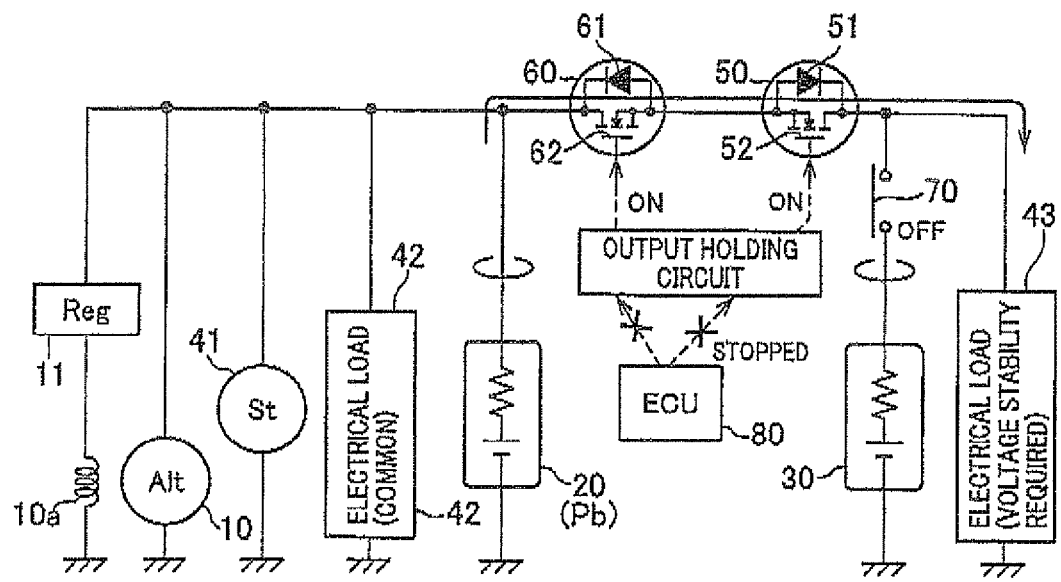
FIG. 16 is an electrical block diagram of a power supply unit according to a fourth embodiment of the present invention.

According to a fourth embodiment shown in FIG. 16, the power supply unit includes an output holding circuit 93 (energization maintaining means) that holds an ON/OFF signal (energization signal) outputted from the ECU 80 to the MOS-FET 50 and 60. In addition, the above-described latch relay 92 and resistive element 90 are eliminated.

The output holding circuit 93 is connected between the MOS-PET 50 and 60, and the ECU 80, and a signal holding function of the output holding circuit 93 is configured to be capable of being stopped by the ECU 80, when the accessory switch is turned ON and power is supplied to the ECU 80, the signal holding function of the output holding circuit 93 is stopped. On the other hand, immediately before the power supply to the ECU 80 is blocked when the accessory switch is turned OFF, the ECU 80 operates the signal holding function, and outputs the energization signal for turning ON the MOS-PET 50 and 60. Therefore, after the power supply to the ECU 80 is blocked, the MOS-FET 50 and 60 remain in the ON state.

As a result, the dark current to the constant-voltage-required electrical load 43 can be supplied from the lead secondary battery 20 via the MOS-PET 50 and 60 that are in the ON state during power OFF.

Fifth Embodiment

According to each of the above-described embodiments shown in FIG. 1 and the like, a single ECU 80 performs both lead secondary battery control for calculating the SOC(Pb) of the lead secondary battery 20 and controlling the operation of the regulator 11 such as that the SOC(Pb) is within the appropriate range, and lithium secondary battery control for calculating the SOC(Li) of the lithium-ion battery 30 and controlling the operations of the MOS-FET 50 and 60 such that the SOC(Li) is within the appropriate range.

Figure 17:
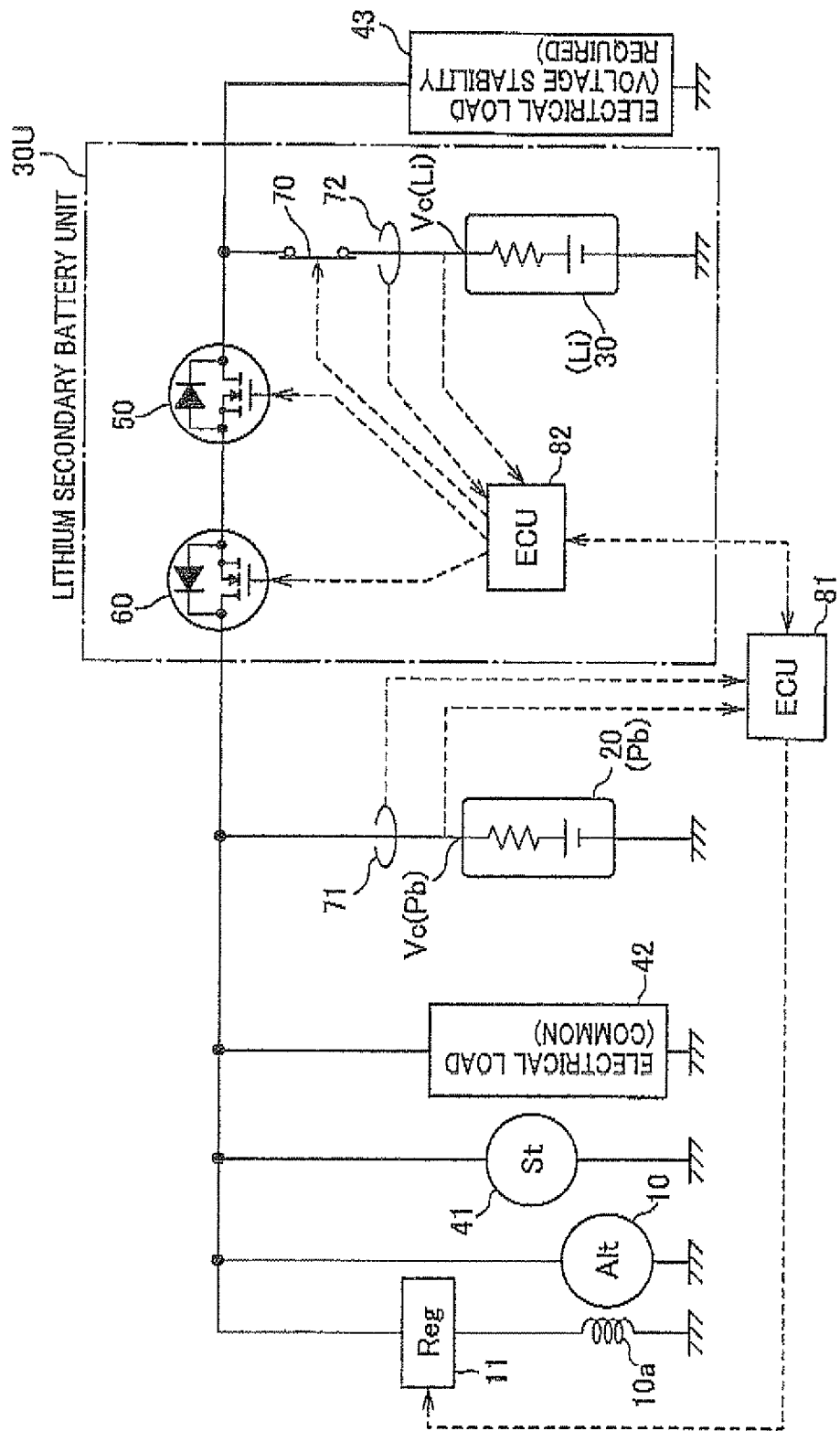
FIG. 17 is an electrical block diagram of a power supply unit according to a fifth embodiment of the present invention.
Figure 18A:
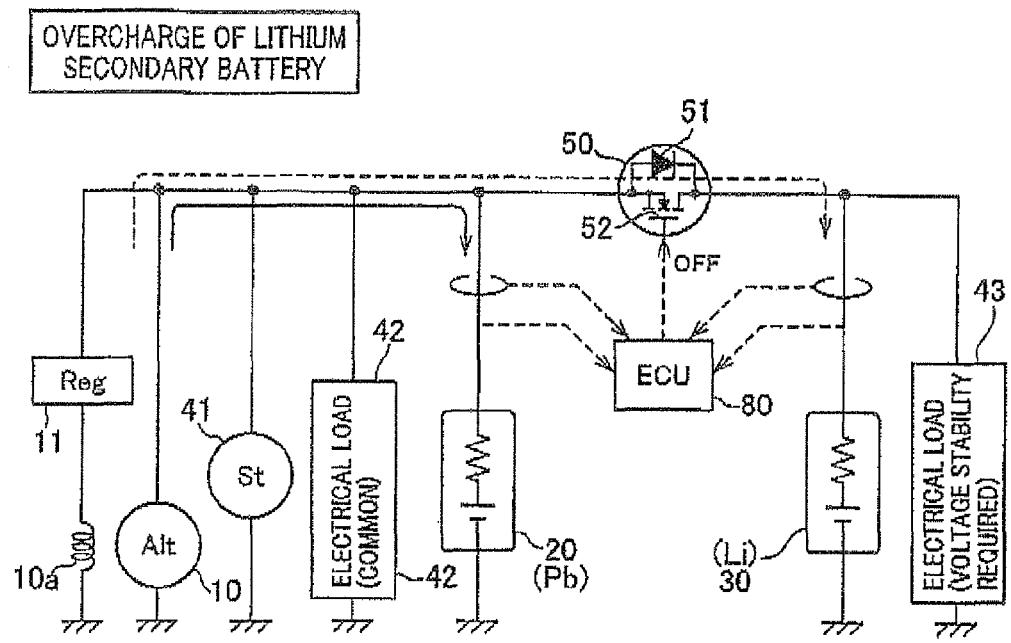
FIG. 18A and FIG. 18E are electrical block diagrams of power supply units examined by the inventors during the process of conceiving the present invention.
Figure 18B:
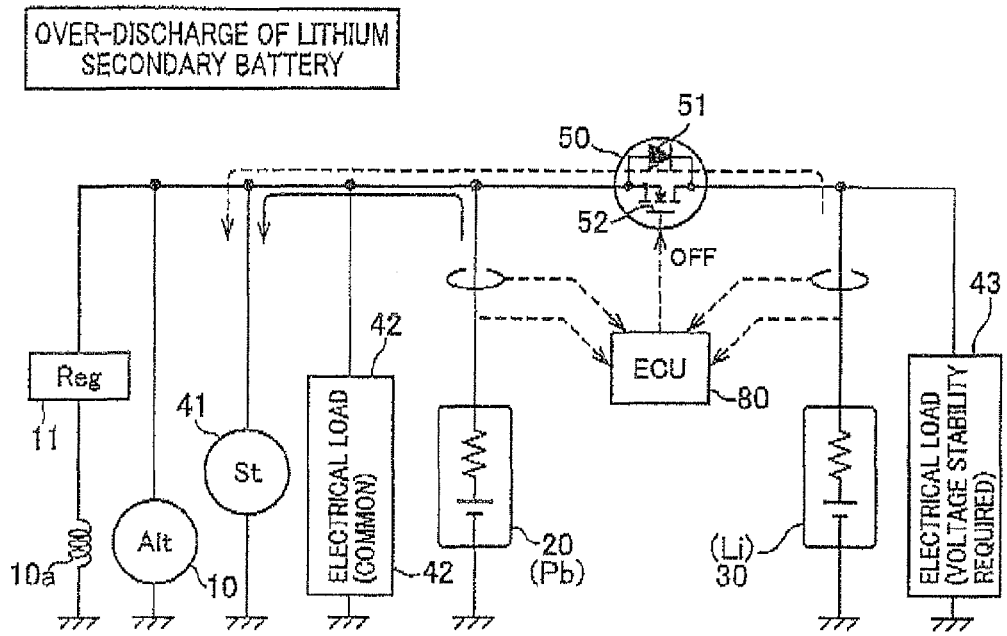

On the other hand, according to a fifth embodiment shown in FIG. 17, an ECU 81 that performs the lead secondary battery control and an ECU 82 that performs the lithium secondary battery control are separately provided. The ECU 82, the lithium-ion battery 30, the MOS-FET 50 and 60, and the Li secondary battery relay 70 are integrally configured as a lithium secondary battery unit 30U. Both ECU 81 and 82 are connected such as to be capable of bi-directional communication.

As a result, the power supply unit can be changed to that in which the lead secondary battery 20 is connected in parallel to the lithium-ion battery 30 simply by the addition of the lithium secondary battery unit 30U to an existing power supply unit composed of the alternator 10, the regulator 11, various electrical loads 41, 42, and 43, the lead secondary battery 20, and the ECU 81. Thus, changes requiring hardware design modification in the existing power supply unit can be reduced.

In the hardware configuration according to the fifth embodiment shown in FIG. 17, as well, control similar to those according to the above-described first to fourth embodiments is performed to control the MOS-FET 50 and 60, the Li secondary battery relay 70, and the regulator 11. Therefore, operations and effects similar to those according to the first to fourth embodiments are achieved according to the fifth embodiment as well.

Other Embodiments

The present invention is not limited to the descriptions according to the above-described embodiments, and may be modified as described hereafter. Characteristic configurations of each embodiment may also be arbitrarily combined.

According to each of the above-described embodiments, the source terminals of the two MOS-FET 50 and 60 are connected to each other. However, the positions of the MOS-FET 50 and the MOS-FET 60 may be reversed, and the drain terminals thereof may be connected to each other. In addition, the number of MOS-FET 50 and 50 are not limited to two, and may be three or more.

According to each of the above-described embodiments, a Li secondary battery relay 70 for emergencies is included. However, the Li secondary battery relay 70 may be eliminated.

According to each of the above-described embodiments, a non-aqueous electrolyte solution-type lithium-ion battery 30 is used as a second secondary battery having voltage characteristics A2. However, the second secondary battery of the present invention is not limited to the lithium secondary battery 30 and, for example, a nickel secondary battery using a nickel compound in its electrodes may be used. However, the above-described conditions (a) to (c) are preferably met.

What is claimed is:

1. A power supply unit comprising:
a power generator that generates power;
a first battery being charged with the power generated by the power generator and electrically connected to a first load and a second load, the first load requiring power higher than that of the second load, the power generator, the first battery and the first load being included in a first circuit, the first battery having a terminal voltage $Vc(Pb)$ when being charged and a terminal voltage $Vd(Pd)$ when discharging;
a second battery that is electrically connected in parallel to the first battery, being charged with the power generated by the power generator, having higher output density or higher energy density than the first battery and electrically connected to a third load, the second battery and the third load being included in a second circuit, the second battery having a terminal voltage $Vc(Li)$ when being charged and a terminal voltage $Vd(Li)$ when discharging; and
a switching means that is electrically connected between the first circuit and the second circuit and which switches between conduction and blocking between the first circuit and the second circuit, wherein
the switching means is configured by a plurality of semiconductor switches being connected in series, each semiconductor switch having a parasitic diode connected in parallel to a switching element thereof, respective parasitic diodes present in the semiconductor switches face opposite directions where current flows, the respective parasitic diodes each having an anode and a cathode and respective anodes of the parasitic diodes being connected to each other, and
the first battery and the second battery including respective terminal voltages satisfying a relationship expressed by:

$Vc(Li) < Vc(Pb)$; and $Vd(Li) > Vd(Pb)$.

2. The power supply unit according to claim 1, wherein the power supply unit further comprises control means for controlling the switching means to be ON and OFF by controlling output of an energization signal applied to the switching means, an electrical load being power-supplied by the second battery is provided at the second battery side against the switching means to be electrically connected in parallel to the second battery, and
the switching means includes an energization maintaining means for maintaining an energized state in which the current flows from the first battery to the second battery side, when a power supply to the control means is stopped.

3. The power supply unit according to claim 2, wherein the energization maintaining means includes a resistor electrically connected in parallel to the switching means, and configured to supply power to the second battery side from the first battery via the resistor, when outputting of the energization signal is stopped since power supply to the control means is stopped.

4. The power supply unit according to claim 3, wherein the energization maintaining means includes the resistor and a rectifying element that is connected in series to the resistor and is disposed such that forward direction of the rectifying element is set to allow the current to flow from the first battery to the second battery side.

5. The power supply unit according to claim 4, wherein the semiconductor switch in which the forward direction of the parasitic diode is set to allow the current to flow from the first battery to the second battery side, is series-connected to the resistor, and the parasitic diode of the semiconductor switch serves as the rectifying element.

6. The power supply unit according to claim 2, wherein the energization maintaining means is a latch switch having a self-latching function, the latch switch turning on to maintain the energized state by the self-latching when outputting of the energization signal is stopped when power supply to the control means is stopped.

7. The power supply unit according to claim 2, wherein the energization maintaining means includes an output holding circuit that holds output of the energization signal, when the power supply to the control means is stopped.

8. The power supply unit according to claim 2, wherein the power supply unit further comprises a second switching means electrically connected a current path between the switching means and the second battery, the second switching means being switched by the control means such that the current path is switched between conduction and blocking states, and serving as a normally-open-type switch to be opened when a second energization signal is not inputted by the control means so as to block the current path.

9. The power supply unit according to claim 1, wherein the switching means switches to the conduction so as to charge the second battery when the amount of stored power of the second battery is lower than a lower threshold value.

10. The power supply unit according to claim 1, wherein the switching means switches to the blocking so as to stop charging the second battery when the amount of stored power of the second battery is higher than a lower threshold value.

* * * * *